(12) United States Patent
Noto

(10) Patent No.: US 9,811,219 B2
(45) Date of Patent: Nov. 7, 2017

(54) TOUCH PANEL CONTROL CIRCUIT AND SEMICONDUCTOR INTEGRATED CIRCUIT USING THE SAME

(71) Applicant: Synaptics Japan GK, Tokyo (JP)

(72) Inventor: Takayuki Noto, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 274 days.

(21) Appl. No.: 14/581,810

(22) Filed: Dec. 23, 2014

(65) Prior Publication Data

US 2015/0177885 A1 Jun. 25, 2015

(30) Foreign Application Priority Data

Dec. 25, 2013 (JP) ................... 2013-266559

(51) Int. Cl.
- *G09G 5/00* (2006.01)
- *G06F 3/044* (2006.01)
- *G06F 3/041* (2006.01)

(52) U.S. Cl.
CPC ............ *G06F 3/044* (2013.01); *G06F 3/0412* (2013.01)

(58) Field of Classification Search
CPC ...... G06F 3/041; G06F 3/0412; G06F 3/0416; G06F 3/0418; G06F 3/047; G06F 2203/04107; G06F 3/044
USPC ....................................... 345/174; 178/18.06
See application file for complete search history.

(56) References Cited

U.S. PATENT DOCUMENTS

| | | | |
|---|---|---|---|
| 2011/0304570 A1* | 12/2011 | Maeda | G06F 3/044 345/173 |
| 2012/0056835 A1 | 3/2012 | Choo et al. | |
| 2012/0287081 A1* | 11/2012 | Akai | G06F 3/044 345/174 |
| 2013/0278538 A1* | 10/2013 | Brunet | G06F 3/044 345/174 |
| 2014/0021966 A1* | 1/2014 | Shahrokhi | G01R 27/2605 324/679 |

* cited by examiner

*Primary Examiner* — Jennifer Nguyen
(74) *Attorney, Agent, or Firm* — Patterson + Sheridan, LLP

(57) ABSTRACT

A touch panel control circuit includes a plurality of drive circuits which are connected to Y sensor electrodes, respectively, and which apply a plurality of pulses to a corresponding Y sensor electrode for every predetermined period, and a plurality of detection circuits which are connected to X sensor electrodes, respectively. Each of the detection circuits includes a switched capacitor circuit that continues sampling of a signal from each of the X sensor electrodes, to which the detection circuits are connected, not only at a timing that is in synchronization with the plurality of pulses that are applied to the Y sensor electrodes, but also at a timing at which the pulses are not applied to the Y sensor electrodes. For example, the switched capacitor circuit is an integration circuit, or an integration circuit with a finite impulse response (FIR) filter or an infinite impulse response (IIR) filter.

20 Claims, 18 Drawing Sheets

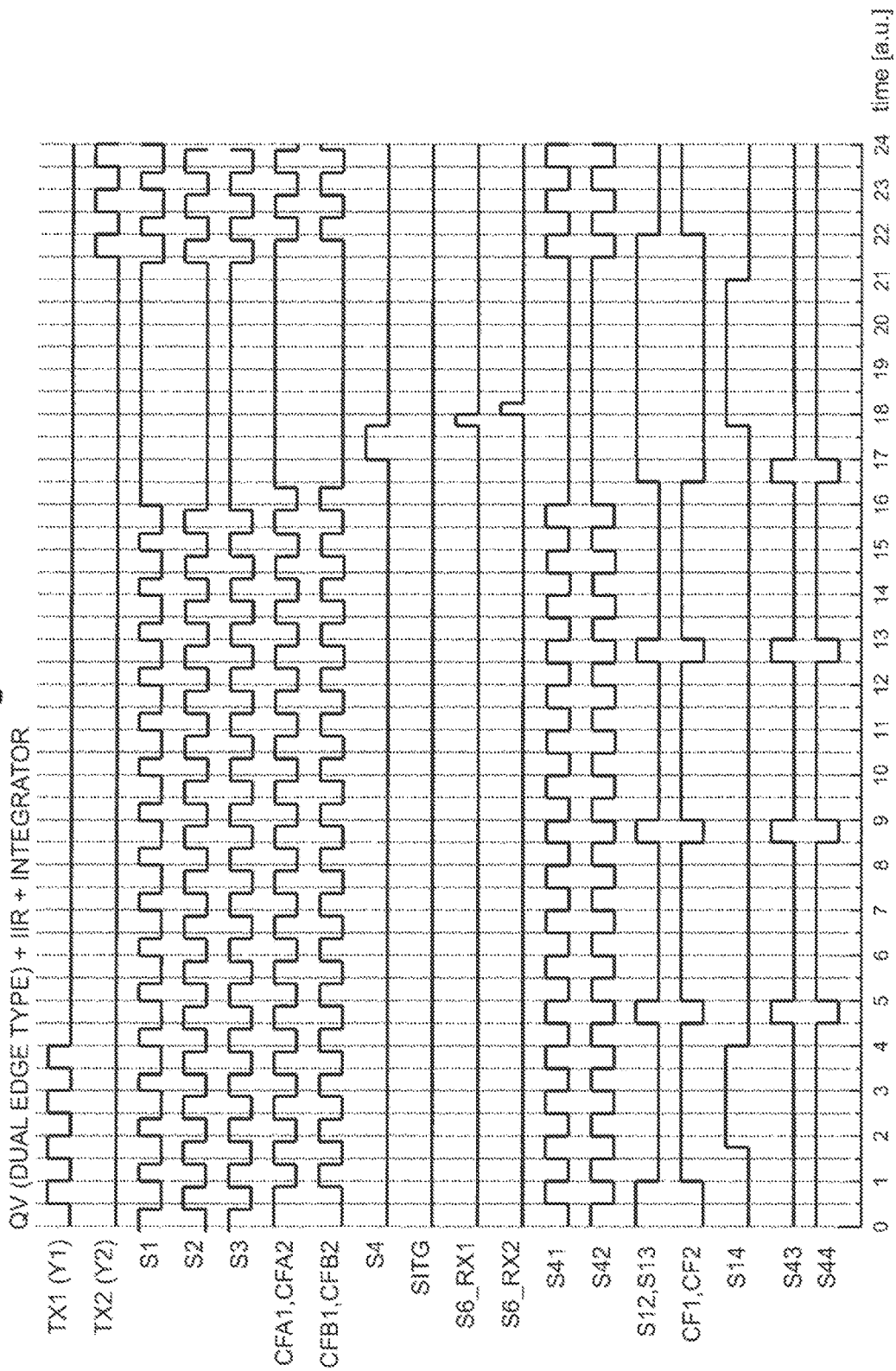

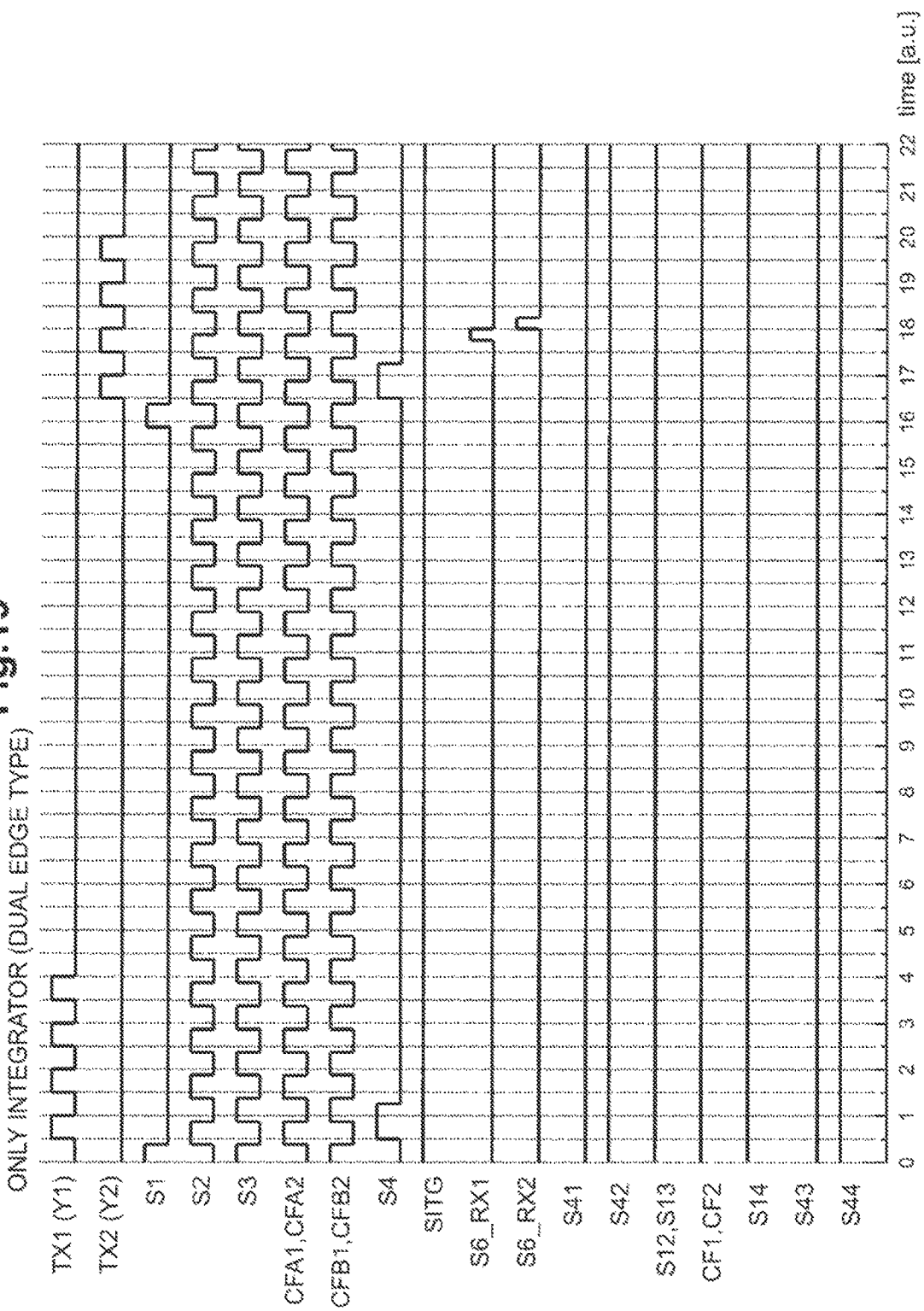

TOUCH PANEL CONTROL CIRCUIT AND SEMICONDUCTOR INTEGRATED CIRCUIT USING THE SAME

CROSS-REFERENCE TO RELATED APPLICATIONS

The Present application claims priority from Japanese application JP 2013-266559 filed on Dec. 25, 2013, the content of which is hereby incorporated by reference into this application.

BACKGROUND

Embodiments of the present invention relates to a touch panel control circuit and a semiconductor integrated circuit including the same, and particularly to, a touch panel control circuit which can be suitably used as a touch panel control circuit that is connected to a touch panel mounted in a display panel so as to overlap the display panel.

In a display panel that is used in a smart phone or a tablet terminal, a touch panel is mounted so as to overlap the display panel, and a user can operate an apparatus by touching (approaching, coming into contact with, or tracing on) a display screen with a finger and the like. The touch panel control circuit is connected to the touch panel and detects coordinates on the display screen which are touched by the user. For example, in a mutual-capacitance type touch panel, a Y sensor electrode as a drive electrode and an X sensor electrode as a detection electrode are disposed perpendicular to each other with a dielectric interposed therebetween, and a capacitor (intersection capacitor) is configured in each intersection. If capacitance due to a finger or a hand is present in the vicinity of the intersection capacitor, mutual capacitance at the intersection is reduced from a capacitance value of the intersection capacitor by a division amount of electric charges that are charged by the capacitance by the finger or the hand. The touch panel control circuit detects the intersection at which a variation of the mutual capacitance occurs and the magnitude thereof.

In a touch panel control circuit that is disclosed in JP-A-2012-234474, a pulse-shaped AC drive voltage is repetitively applied to an intersection capacitor from a Y sensor electrode and electric charges corresponding to a capacitance value of the intersection capacitor at that time are transmitted and are accumulatively added by an integration circuit connected to the X sensor electrode. In this manner, detection is performed. At this time, the amplitude of the drive AC voltage that is applied is increased to increase the signal level (amount of electric charges that are transmitted), and the timing between signals that drive the display panel is retarded in order to decrease a noise level that is affected by a display drive signal, thereby improving a signal/noise ratio (S/N ratio).

In a display device disclosed in JP-A-2012-59265, a display panel operating period and a touch sensing period are divided in a time-division manner, thereby preventing a display drive signal having an effect on touch detection as a noise.

SUMMARY

Embodiments of the present disclosure provide a touch panel control circuit configured to be connected to a touch panel in which an intersection capacitor is formed at each of a plurality of intersections at which a plurality of Y sensor electrodes and a plurality of X sensor electrodes intersect each other. The touch panel control circuit includes a plurality of drive circuits connected to the plurality of Y sensor electrodes, respectively, and configured to apply a plurality of pulses to a corresponding Y sensor electrode for a predetermined period. The touch panel control circuit further includes a plurality of detection circuits connected to the plurality of X sensor electrodes, respectively. Each of the detection circuits includes a switched capacitor circuit configured to perform sampling of a signal from each of the X sensor electrodes, to which the detection circuits are connected, at a timing that is in synchronization with the plurality of pulses, and at a timing at which the plurality of pulses are not applied to the Y sensor electrodes in the predetermined period. Another embodiments of the present disclosure provides a semiconductor integrated circuit having a touch panel control circuit disposed on a single semiconductor substrate. The touch panel control circuit is configured to be connected to a touch panel in which an intersection capacitor is formed at each of a plurality of intersections at which a plurality of Y sensor electrodes and a plurality of X sensor electrodes intersect each other. The touch panel control circuit includes a plurality of drive circuits connected to the plurality of Y sensor electrodes, respectively, and configured to apply a plurality of pulses to a corresponding Y sensor electrode for a predetermined period. The touch panel control circuit further includes a plurality of detection circuits connected to the plurality of X sensor electrodes, respectively. Each of the detection circuits includes a switched capacitor circuit configured to perform sampling of a signal from each of the X sensor electrodes, to which the detection circuits are connected, at a timing that is in synchronization with the plurality of pulses, and at a timing at which the plurality of pulses are not applied to the Y sensor electrodes in the predetermined period.

Embodiments of the present disclosure provide a touch panel control circuit configured to be connected to a touch panel in which an intersection capacitor is formed at each of a plurality of intersections at which a plurality of Y sensor electrodes and a plurality of X sensor electrodes intersect each other. The touch panel control circuit includes a plurality of drive circuits connected to the plurality of Y sensor electrodes, respectively, and configured to apply a plurality of pulses to a corresponding Y sensor electrode for every predetermined period. The touch panel control circuit further includes a plurality of detection circuits connected to the plurality of X sensor electrodes, respectively, through a plurality of input terminals. The touch panel control circuit includes a sequence control circuit configured to control operation sequences of the plurality of drive circuits and the plurality of detection circuits. Each of the detection circuits includes a switched capacitor circuit, an input terminal connected to a corresponding X sensor electrode, and an input switch configured to perform control of electrically connecting and cutting off the switched capacitor circuit. The sequence control circuit is configured to perform control of electrically connecting and cutting off the input switch with respect to the detection circuit in the predetermined period in a continuous and repetitive manner at a predetermined cycle, and is further configured to allow the drive circuit to intermittently apply the plurality of pulses to a corresponding Y sensor electrode in the predetermined period in synchronization with the predetermined cycle.

Another embodiment of the present disclosure provides a semiconductor integrated circuit having a touch panel control circuit disposed on a single semiconductor substrate. The touch panel control circuit is configured to be connected to a touch panel in which an intersection capacitor is formed at each of a plurality of intersections at which a plurality of Y sensor electrodes and a plurality of X sensor electrodes intersect each other. The touch panel control circuit includes a plurality of drive circuits connected to the plurality of Y sensor electrodes, respectively, and configured to apply a plurality of pulses to a corresponding Y sensor electrode for every predetermined period. The touch panel control circuit further includes a plurality of detection circuits connected to the plurality of X sensor electrodes, respectively, through a plurality of input terminals. The touch panel control circuit includes a sequence control circuit configured to control operation sequences of the plurality of drive circuits and the plurality of detection circuits. Each of the detection circuits includes a switched capacitor circuit, an input terminal connected to a corresponding X sensor electrode, and an input switch configured to perform control of electrically connecting and cutting off the switched capacitor circuit. The sequence control circuit is configured to perform control of electrically connecting and cutting off the input switch with respect to the detection circuit in the predetermined period in a continuous and repetitive manner at a predetermined cycle, and is further configured to allow the drive circuit to intermittently apply the plurality of pulses to a corresponding Y sensor electrode in the predetermined period in synchronization with the predetermined cycle.

BRIEF DESCRIPTION OF THE DRAWINGS

FIG. 18 is a timing chart illustrating a fifth operation mode (dual edge detection type QV conversion+IIR+integration circuit) of the detection circuit according to the third embodiment; and FIG. 19 is a timing chart illustrating a sixth operation mode (only of a dual edge detection type integration circuit) of the detection circuit according to the third embodiment.

DETAILED DESCRIPTION

1. Introduction

Figure 1:
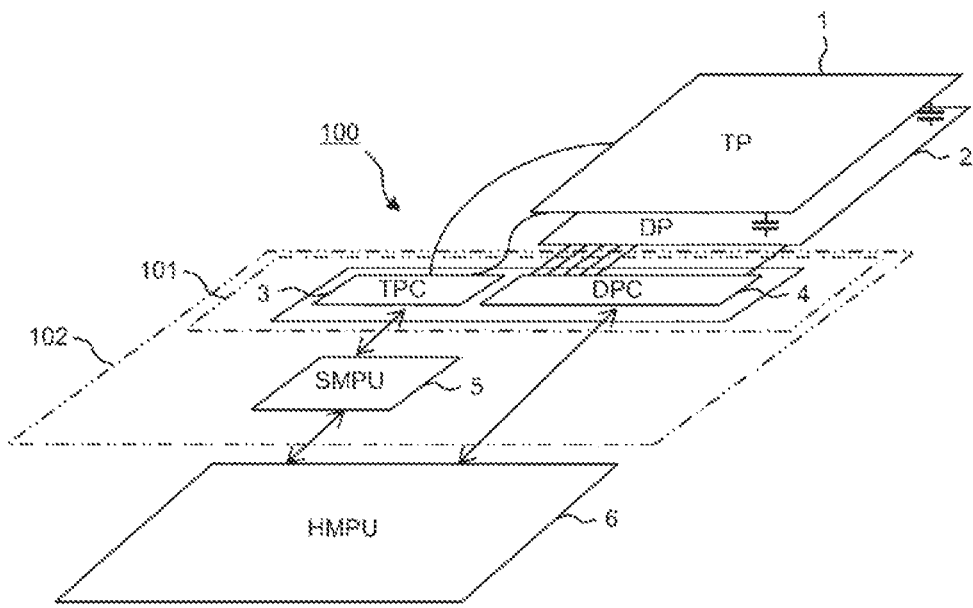
FIG. 1 is a block diagram illustrating an overall configuration of a display and input device that is an example of electronic equipment to which the invention is applied.

The present inventors have conducted an investigation on Japanese Patent Application Nos. JP-A-2012-234474 and JP-A-2012-59265, and as a result, the present inventors have found that new problems are present as described below.

In JP-A-2012-234474 and JP-A-2012-59265, with regard to the touch panel control circuit connected to the touch panel that is mounted on the display panel so as to overlap therewith, attention is given to a display panel drive signal that becomes noise with respect to touch detection. That is, noise that is mixed-in from the display panel can be reduced with respect to the intersection capacitor of the touch panel.

From the results of the investigation by the present inventors, with regard to noise with respect to the intersection capacitor, it could be seen that in a relatively severe environment, the noise mixed-in from a finger and the like of the user that operates the touch panel is considerably large. For example, a potential variation of an apparatus from a ground level when the apparatus, on which the touch panel is mounted, is connected to a battery charger from a commercial power supply, or an effect from an electromagnetic wave which is present in an environment in which a power supply interconnection or the user receives the electromagnetic wave as an antenna, is mixed-in as noise. The integration circuit disclosed in JP-A-2012-234474 has an effect of suppressing noise, but in a severe environment as described above, it could be seen that a noise suppressing effect is not sufficient in some cases. In addition, it is possible to reduce noise that is mixed-in from the display panel by combining the division operation disclosed in JP-A-2012-59265 to the technology disclosed in JP-A-2012-234474, but it could be seen that the noise suppressing effect is not sufficient in some cases.

Embodiments of the present disclosure are configured to obtain a higher noise suppression effect, and particularly, to further suppress external noise other than noise that is mixed-in from a display panel.

Embodiments for solving the above-described problems are described below, but other problems and new features will become apparent from description of this specification and attached drawings.

An embodiment is as follows.

There is provided a touch panel control circuit that is connected to a touch panel in which an intersection capacitor is formed at each of a plurality of intersections at which a plurality of Y sensor electrodes and a plurality of X sensor electrodes intersect each other.

The touch panel control circuit includes a plurality of drive circuits which are connected to the plurality of Y sensor electrodes, respectively, and which apply a plurality of pulses to a corresponding Y sensor electrode for every predetermined period, and a plurality of detection circuits which are connected to the plurality of X sensor electrodes, respectively. Each of the detection circuits includes a switched capacitor circuit that continues sampling of a signal from the X sensor electrodes to which the detection circuit is connected not only at a timing that synchronizes with the plurality of pulses that are applied to the Y sensor electrodes, but also at a timing at which the pulses are not applied.

An effect obtained by the embodiment can be briefly described as follows.

That is, since the sampling continues even in a time period in which the pulses are not applied to the Y sensor electrode, it is possible to improve the effect of suppressing external noise.

2. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Detection Circuit Sampling X Sensor Electrode with Frequency Higher than Drive Pulse of Y Sensor Electrode A touch panel control circuit (TPC, 3) according to a representative embodiment disclosed in this application is capable of being connected to a touch panel (TP, 1) in which an intersection capacitor (Cxy) is formed at each of a plurality of intersections at which a plurality of Y sensor electrodes (Y1 to YM) and a plurality of X sensor electrodes (X1 to XN) intersect each other.

The touch panel control circuit includes a plurality of drive circuits (30_1 to 30_M) which are connected to the plurality of Y sensor electrodes, respectively, and which apply a plurality of pulses to a corresponding Y sensor electrode for every predetermined period, and a plurality of detection circuits (10_1 to 10_N) which are connected to the plurality of X sensor electrodes, respectively.

Each of the detection circuits (10) includes a switched capacitor circuit (11, 12, 13) that performs sampling of a signal from each of the X sensor electrodes, to which the detection circuits are connected, not only at a timing that is in synchronization with the plurality of pulses, but also at a timing at which the pulses are not applied to the Y sensor electrodes in the predetermined period.

According to this, it is possible to obtain a higher noise suppression effect. Pulse drive with respect to the Y sensor electrodes is intermittently performed in a predetermined period, but the sampling by the switched capacitor circuit (11) included in the detection circuit (10) continues even in a period in which the pulses are not applied to the Y sensor electrodes. According to this, in the case where display drive and touch detection are performed in a time-division manner, it is possible to increase the effect of suppressing external noise.

[2] Drive Pulse is Stopped at Display Period and Detection Continuously Operated In the touch panel control circuit according to Section [1], the touch panel is mounted so as to overlap a display panel (2), and the touch panel control circuit has a configuration capable of performing timing control of time-dividing a display drive period of the display panel and a touch detection period of the touch panel.

The drive circuit stops output of the pulses in the display drive period, and the detection circuit allows the switched capacitor circuit to continue an operation of sampling a signal from the X sensor electrodes in the display drive period and the touch detection period.

According to this, it is possible to further suppress external noise other than noise that is mixed-in from the display panel.

[3] Control of Drive Circuit and Detection Circuit in Synchronization with the Same Clock The touch panel control circuit according to Section [1] or [2] further includes a sequence control circuit (SQENC, 308), and the sequence control circuit controls the drive circuit and the detection circuit in synchronization with the same clock (CLK).

According to this, it is possible to perform timing control between the pulses for driving the Y sensor electrodes and the sampling by the detection circuit with high accuracy by using a simple circuit.

[4] Detection Circuit Continuously Operates

In the touch panel control circuit according to any one of Sections [1] to [3], the operation of sampling the signal from the X sensor electrodes by the switched capacitor circuit continues in the predetermined period at a predetermined cycle.

According to embodiments, the noise suppressing effect becomes maximal. This is because a peak having a pass characteristic accompanying an intermittent operation may not occur in frequency characteristics of the switched capacitor circuit, and a sampling frequency may become the highest frequency capable of being taken in the predetermined period at the predetermined cycle.

[5] Touch Detection Window

The touch panel control circuit according to Section [2] further includes a sequence control circuit (SQENC, 308) that controls the drive circuit and the detection circuit in synchronization with the same clock (CLK).

A horizontal synchronization signal (Hsync) of an image displayed on the display panel, or timing control information (TPCtiming, TPCparam, DPtiming, DPCparam) based on the horizontal synchronization signal is input to the touch panel control circuit, and the touch detection period is controlled on the basis of the horizontal synchronization signal or the timing control information.

The sequence control circuit allows the switched capacitor circuit to continue the operation of sampling the signal from the X sensor electrodes in the display drive period and the touch detection period at a predetermined cycle based on the clock, outputs the pulses from the drive circuit in the touch detection period at the predetermined cycle based on the clock, and stops the output of the pulses from the drive circuit in the display drive period.

According to embodiments, it is possible to perform timing control between the pulses for driving the Y sensor electrodes and the sampling with the detection circuit having high accuracy by using a simple circuit.

Figure 9:
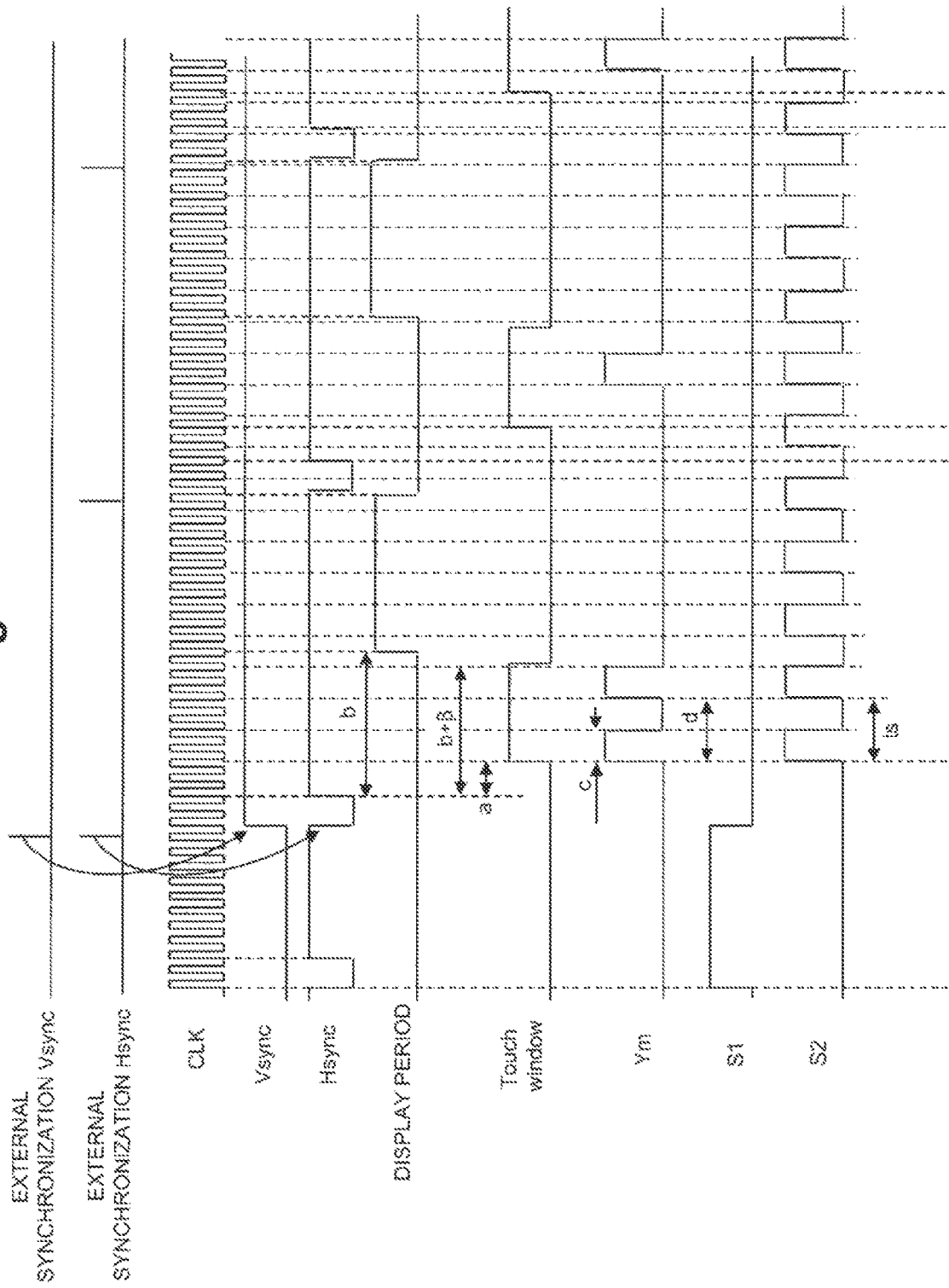
FIG. 9 is a timing chart illustrating an operation example of a touch panel controller of the invention.

[6] Timing Control Information Indicating Display Drive Period and Touch Detection Period In the touch panel control circuit according to Section [5], the timing control information includes first information (b) that specifies a period to initiation of the display drive period from the horizontal synchronization signal, second information (a) that specifies a period to initiation of the touch detection period from the horizontal synchronization signal, and third information (c) that specifies a cycle of the pulses and a high-period (refer to FIG. 9).

According to embodiments, it is possible to perform timing control between the pulses for driving the Y sensor electrodes and the sampling by the detection circuit in a relatively reliable manner by using a simple circuit.

[7] Timing Control Register

In the touch panel control circuit according to Section [6], the touch panel control circuit includes a storage device (CREG, 320) capable of storing at least one piece of information among the first information, the second information, and the third information.

According to embodiments, it is possible to control the timing between the pulses for driving the Y sensor electrodes and the sampling with the detection circuit in a programmable manner. For example, the storage device (CREG, 320) is constituted by a register.

[8] Integration Circuit

Figure 12:
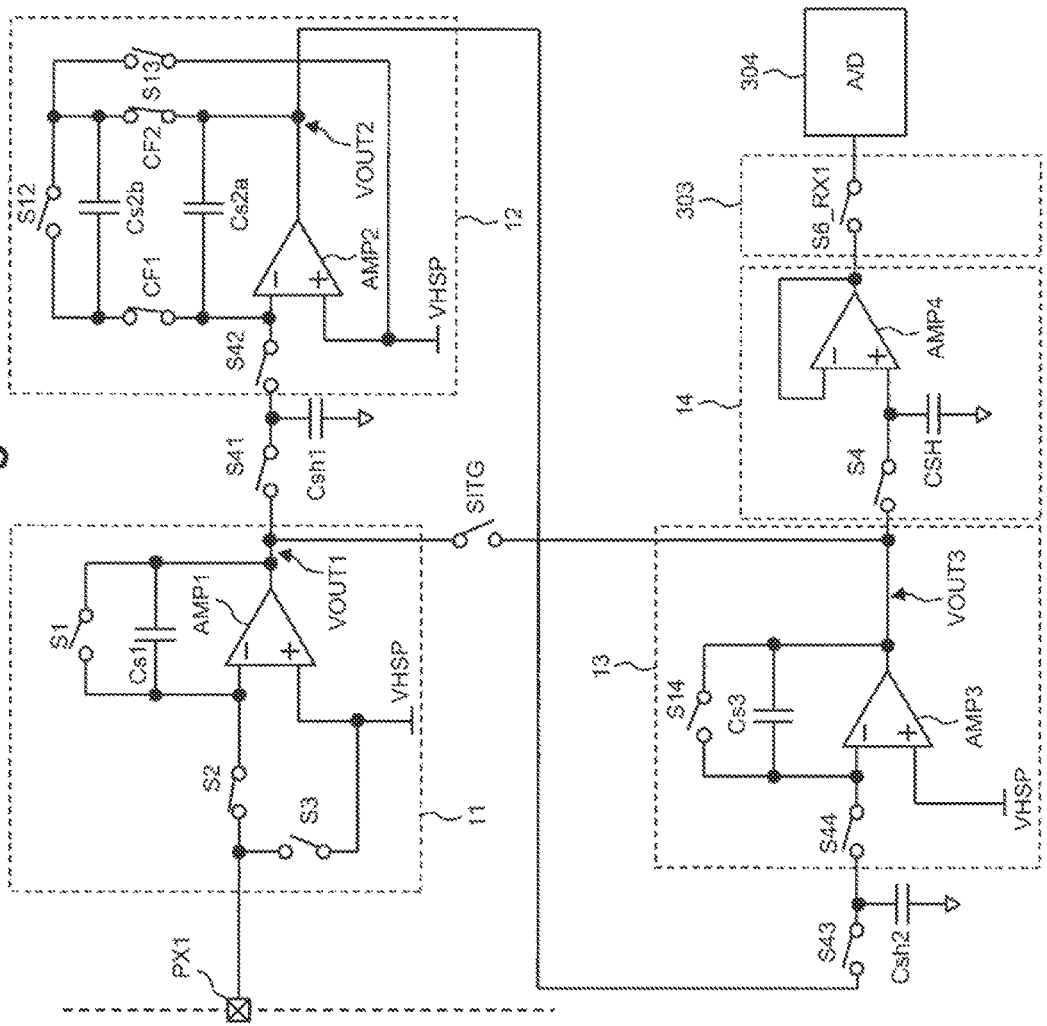
FIG. 12 is a circuit diagram illustrating a configuration example of a detection circuit (single edge detection type) according to a second embodiment.
Figure 15:
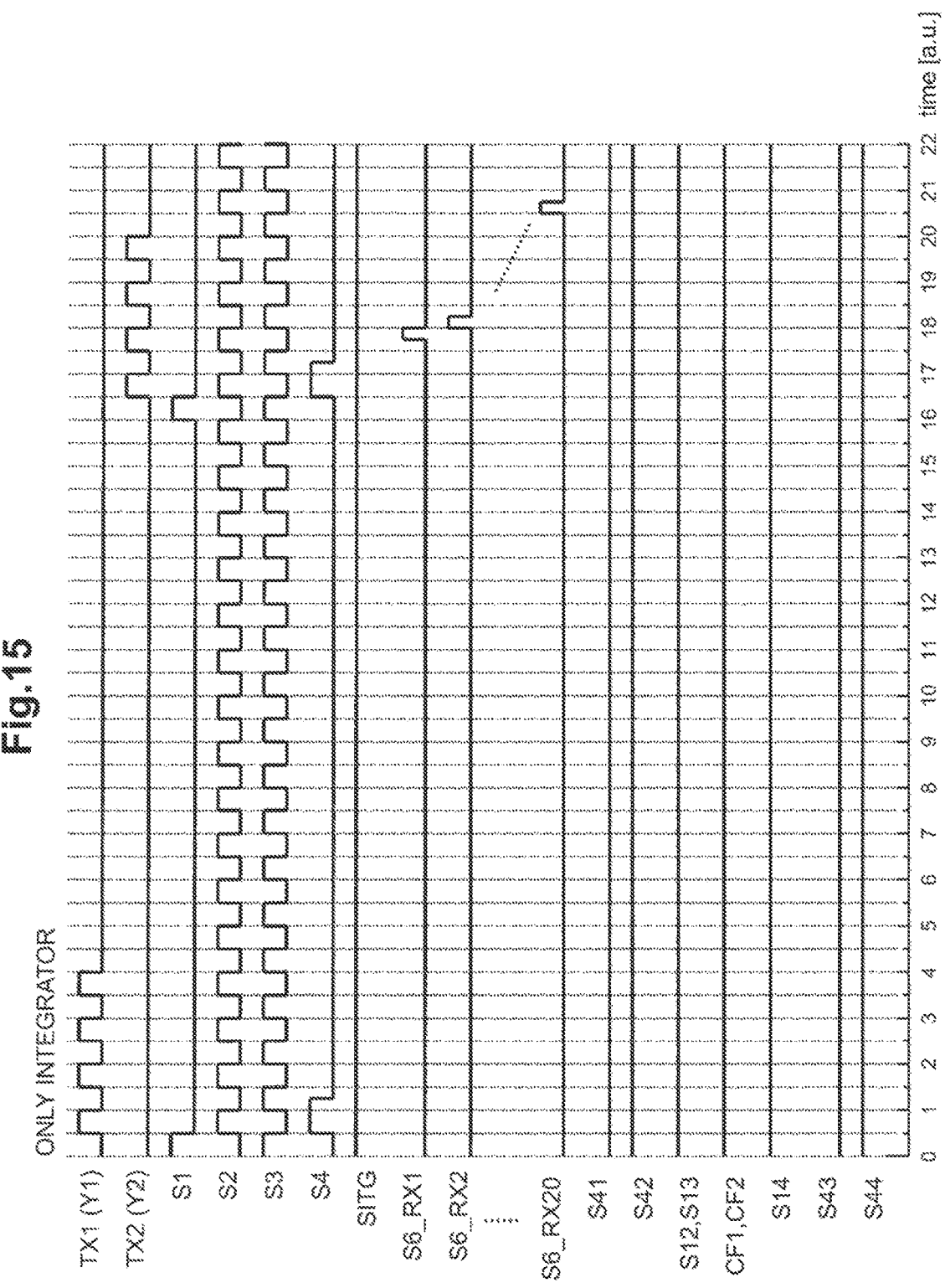
FIG. 15 is a timing chart illustrating a third operation mode (only of a single edge detection type integration circuit) of the detection circuit according to the second embodiment.

In the touch panel control circuit according to any one of Sections [1] to [7], the switched capacitor circuit includes an integration circuit (13) which is connected to the X sensor electrodes in the predetermined period in synchronization with the pulses, and is also connected to the X sensor electrodes even in a period in which the pulses are not input to accumulatively add signal charges that are input from the X sensor electrodes (refer to FIGS. 12 and 15).

According to embodiments, in the case of performing the display drive and the touch detection in a time-division manner, it is possible to increase the noise suppressing effect.

[9] Dual Edge Detection Type Integration Circuit

In the touch panel control circuit according to Section [8], the integration circuit is connected to the X sensor electrodes in periods in accordance with a rising edge and a falling edge of the pulses, respectively. The integration circuit is also connected to the X sensor electrodes in periods in accordance with a rising edge and a falling edge when assuming that the pulses continue at a cycle as is even in a period in which the pulses are not applied to the Y sensor electrodes to perform the accumulative addition by inverting the polarity when adding a signal charge that is input in the period corresponding to the rising edge and the polarity when adding a signal charge that is input in the period corresponding to the falling edge (refer to FIGS. 16 and 19) to each other.

According to this, in the case of performing the display drive and the touch detection in a time-division manner, it is possible to further increase the noise suppression. In addition, with respect to one pulse, sampling is performed twice at the rising and the falling, and thus a signal level is raised. Accordingly, it is possible to improve touch detection sensitivity.

[10] Switched Capacitor Filter+Integration Circuit

In the touch panel control circuit according to any one of Sections [1] to [7], the switched capacitor circuit includes a switched capacitor filter (11, 12) which is connected to the X sensor electrodes in the predetermined period in synchronization with the pulses, and is also connected to the X sensor electrodes even in a period in which the pulses are not applied to the Y sensor electrodes to perform a filtering process with respect to a signal charge that is input from the X sensor electrodes, and an integration circuit (13) that accumulatively adds an output of the switched capacitor filter (refer to FIGS. 12 to 15).

According to this, it is possible to further increase the noise suppressing effect of the detection circuit that is constituted by the switched capacitor filter (SCF) and the integration circuit.

[11] Dual Edge Detection Type Switched Capacitor Filter

In the touch panel control circuit according to Section [10], the switched capacitor filter is connected to the X sensor electrodes in periods in accordance with a rising edge and a falling edge of the pulses, respectively. The switched capacitor filter is also connected to the X sensor electrodes in periods in accordance with a rising edge and a falling edge when assuming that the pulses continue at a cycle as is even in a period in which the pulses are not applied to the Y sensor electrodes to perform the filtering process by inverting a polarity when adding a signal charge that is input in the period corresponding to the rising edge and a polarity when adding a signal charge that is input in the period corresponding to the falling edge (refer to FIGS. 16 to 19) to each other.

According to this, it is possible to increase the noise suppressing effect of the detection circuit constituted by the switched capacitor filter (SCF) and the integration circuit. In addition, with respect to one pulse, sampling is performed twice at the rising and the falling thereof, and thus a signal level is raised. Accordingly, it is possible to improve touch detection sensitivity.

[12]+SH+Selector+ADC

The touch panel control circuit according to any one of Sections [8] to [11] further includes a sequence control circuit (SQENC, 308), an analog/digital conversion (ADC) circuit (304), a plurality of sample-and-hold (SH) circuits (14) that retain outputs of the plurality of detection circuits, respectively, and a selection circuit (303) that selects one voltage from a plurality of voltages retained in the sample-and-hold circuits, and supplies the selected voltage to the analog/digital conversion circuit.

The sequence control circuit controls the plurality of drive circuits (30_1 to 30_M) in synchronization with a clock (CLK) in order for the plurality of pulses to be sequentially applied to the plurality of Y sensor electrodes (Y1 to YM) in a predetermined period to allow the plurality of detection circuits (10_1 to 10_N) to operate in parallel in synchronization with the clock for every predetermined period. The sequence control circuit controls the selection circuit in order for outputs of the plurality of detection circuits to be sequentially supplied to the analog/digital conversion circuit.

According to this, the described embodiment may sequentially measure a variation in capacitance of each of the intersection capacitors that are two-dimensionally arranged by one digital/analog converter, and may supply digital data that is used to perform a process such as touch coordinate detection by digital signal processing.

[13] Touch Panel Controller IC

A semiconductor integrated circuit according to a representative embodiment disclosed in this application is a semiconductor integrated circuit (3, 101, 102) including the touch panel control circuit (TPC, 3) according to any one of Sections [1] to [12] on a single semiconductor substrate.

According to embodiments, a touch panel controller integrated circuit (IC) as a semiconductor IC including a touch panel control circuit having high noise resistance is provided.

[14] Display Driver+Touch Panel Controller IC

The semiconductor integrated circuit (101, 102) according to Section [13] further includes a display drive circuit (DPC, 4), which is connected to a display panel configured to overlap the touch panel and which is capable of driving and controlling the display panel, on the semiconductor substrate.

According to embodiments, a semiconductor integrated circuit (IC) is connected to a display and a touch panel in which the display panel and the touch panel are laminated and are integrally configured, and thus mutual cooperation of the display drive and touch sensing control is facilitated.

[15] Display Driver+Touch Panel Controller+Microcomputer IC

The semiconductor integrated circuit (102) according to Section [14] further includes a microcontroller (SMPU, 5), which is capable of controlling the touch panel control circuit and is capable of reading out data based on the output of the detection circuit, on the semiconductor substrate.

According to embodiments, a semiconductor integrated circuit (IC), in which the microcontroller is further integrated in the same chip, is provided, and thus the mutual cooperation of the display drive and the touch sensing control is increasingly facilitated. Accordingly, it is possible to reduce the burden of an application processor that is attached outside.

[16] Detection Circuit Sampling X Sensor Electrode with Frequency Higher than Drive Pulse of Y Sensor Electrode A touch panel control circuit (TPC, 3) according to a representative embodiment disclosed in this application is capable of being connected to a touch panel (TP, 1) in which an intersection capacitor (Cxy) is formed at each of a plurality of intersections at which a plurality of Y sensor electrodes (Y1 to YM) and a plurality of X sensor electrodes (X1 to XN) intersect each other.

The touch panel control circuit includes a plurality of drive circuits (30_1 to 30_M) which are connected to the plurality of Y sensor electrodes, respectively, and which apply a plurality of pulses to a corresponding Y sensor electrode in every predetermined period, a plurality of detection circuits (10_1 to 10_N) which are connected to the plurality of X sensor electrodes, respectively, through a plurality of input terminals (PX1 to PXN), and a sequence control circuit (SQENC, 308) that controls operation sequences of the drive circuits and the detection circuits.

Each of the detection circuits includes a switched capacitor circuit (11, 12, 13), an input terminal that is connected to a corresponding X sensor electrode, and an input switch (S2) capable of performing control of electrically connecting or cutting off the switched capacitor circuit.

The sequence control circuit performs control of electrically connecting or cutting off the input switch with respect to the detection circuit in the predetermined period in a continuous and repetitive manner at a predetermined cycle. The sequence control circuit allows the drive circuit to intermittently apply the plurality of pulses to a corresponding Y sensor electrode in the predetermined period in synchronization with the predetermined cycle.

According to embodiments, it is possible to obtain a greater noise suppressing effect. The sampling by the switched capacitor circuit that is included in the detection circuit continues in the predetermined period. In contrast, the pulse drive to the Y sensor electrode is intermittently performed. Accordingly, even in the case of performing the display drive and the touch detection in a time-division manner, it is possible to increase the noise suppressing effect.

[17] Integration Circuit

In the touch panel control circuit according to Section [16], the switched capacitor circuit includes a first operational amplifier (AMP1) in which a positive side input is fixed to a predetermined potential (VHSP), a first integration capacitor (Cs1) that is connected to between a negative side input and an output of the first operational amplifier, a first switch (S1) that is connected to between the negative side input and the output of the first operational amplifier, and the input switch (S2). The input switch is connected to the input terminal and the negative side input of the first operational amplifier (refer to FIG. 12).

The sequence control circuit allows the drive circuit to intermittently apply the plurality of pulses to a corresponding Y sensor electrode in the predetermined period at the same cycle as the predetermined cycle to electrically connect the first switch for every predetermined period and to discharge the first integration capacitor (refer to FIG. 15).

According to this, the switched capacitor circuit is configured as an integration circuit. In the case of performing the display drive and the touch detection in a time-division manner, it is possible to further increase the noise suppressing effect in comparison to using an integration circuit of the related art.

[18] Integration Circuit (Dual Edge Type)

Figure 16:
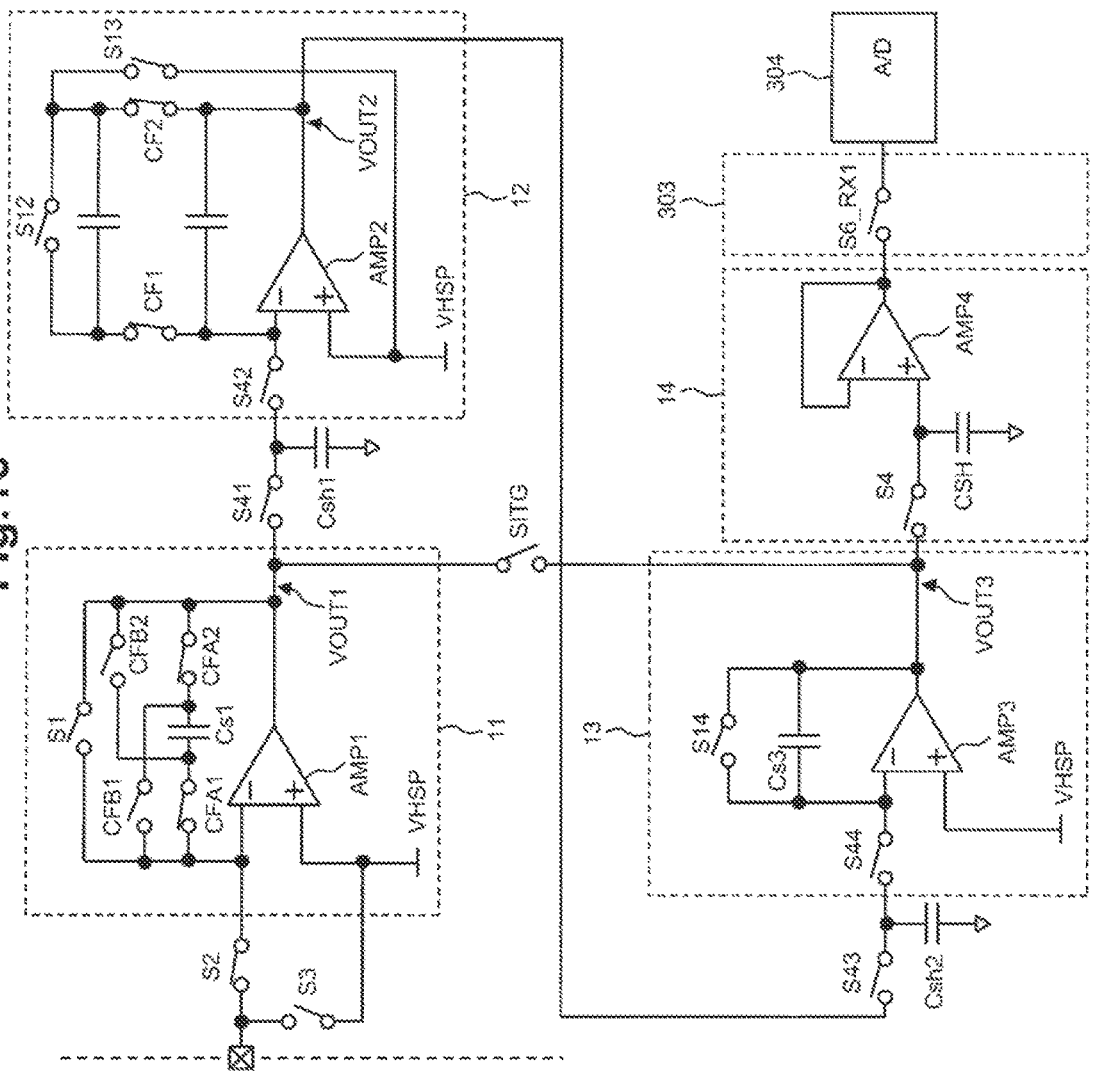
FIG. 16 is a circuit diagram illustrating a configuration example of a detection circuit (dual edge detection type) according to a third embodiment.

In the touch panel control circuit according to Section [17], the switched capacitor circuit has a configuration capable of performing control of inverting a connection direction of the first integration capacitor (refer to FIG. 16).

The sequence control circuit controls the timing of turning on/off the input switch and the first switch of the detection circuit and a timing of inverting the connection direction of the first integration capacitor in synchronization with a rising edge and a falling edge of the plurality of pulses that are output to the drive circuit. In a period in which the pulses are not input, the sequence control circuit turns on/off the input switch at timings in accordance with a rising edge and a falling edge thereof when assuming that the pulses continue at a cycle so as to invert a connection direction of the first integration capacitor in a period corresponding to the rising edge and a connection direction of the first integration capacitor in a period corresponding to the falling edge to each other (refer to FIG. 19).

Accordingly, embodiments of the present disclosure may double the number of integrations performed in the same time period compared to an integration circuit of the related art, and thus improve touch detection sensitivity.

[19] FIR+IIR+Integration Circuit

In the touch panel control circuit according to Section [16], in the detection circuit, a first switched capacitor circuit (11) that is connected to the input switch, a first sample-and-hold circuit (S41, Csh1), a second switched capacitor circuit (12), a second sample-and-hold circuit (S43, Csh2), an integration circuit (13), and a third sample-and-hold circuit (14) that retains an output of the detection circuit are sequentially connected (refer to FIG. 12).

The first switched capacitor circuit includes a first operational amplifier (AMP1) in which a positive side input is fixed to a predetermined potential (VHSP), a first integration capacitor (Cs1) that is connected to between a negative side input and an output of the first operational amplifier, a first switch (S1) that is connected to between the negative side input and the output of the first operational amplifier, and a second switch (S2) that is connected to between the input terminal and the negative side input of the first operational amplifier. The input switch is connected to between the input terminal (PX1) and the negative side input of the first operational amplifier.

The second switched capacitor circuit includes a second operational amplifier (AMP2) in which a positive side input is fixed to a predetermined potential (VHSP), a second integration capacitor (Cs2a, Cs2b) that is connected to between a negative side input and an output of the second operational amplifier, and has a configuration in which a part or the entirety of the capacitance value is capable of being discharged by control, and a fourth switch (S42) that is connected to between an output of the first sample-and-hold circuit and the negative side input of the second operational amplifier.

The integration circuit includes a third operational amplifier (AMPS) in which a positive side input is fixed to a predetermined potential (VHSP), a third integration capacitor (Cs3) that is connected to between a negative side input and an output of the third operational amplifier, a third switch (S14) that is connected to between the negative side input and the output of the third operational amplifier, and a fifth switch (S44) that is connected to between an output of the second sample-and-hold circuit and the negative side input of the third operational amplifier.

Figure 13:
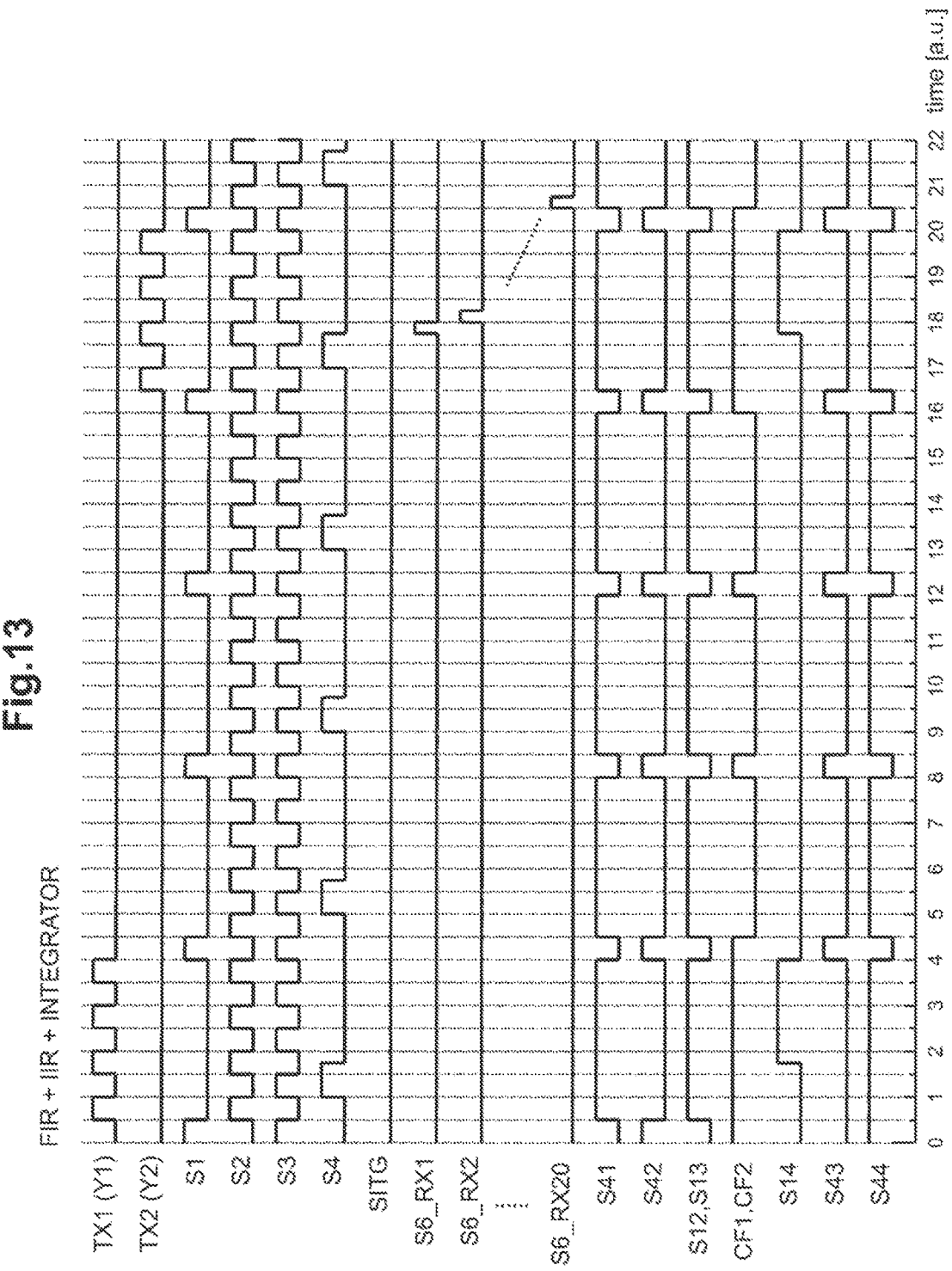
FIG. 13 is a timing chart illustrating a first operation mode, finite impulse response (FIR)+infinite impulse response (IIR)+integration circuit, of the detection circuit (single edge detection type) according to the second embodiment.
Figure 14:
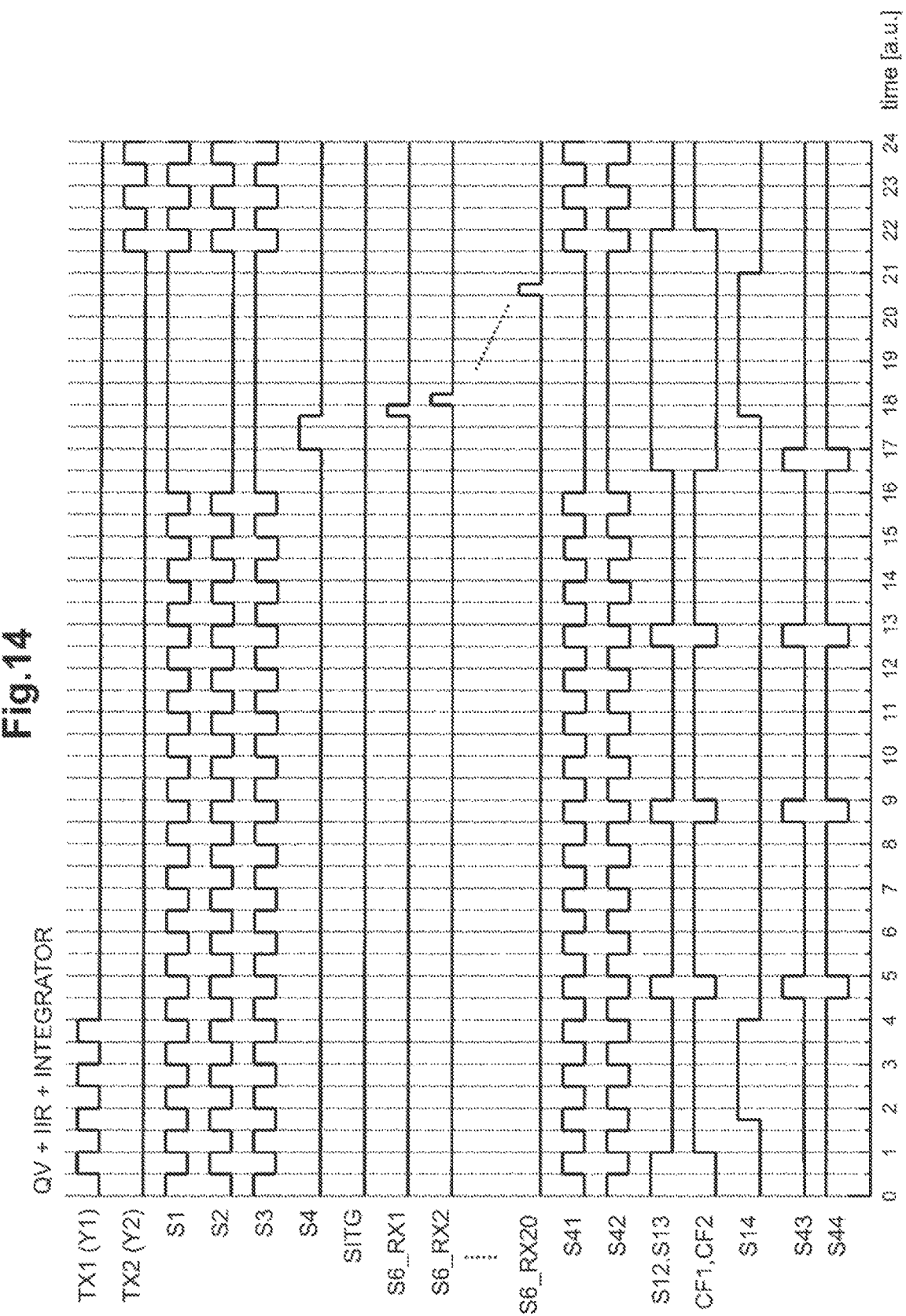
FIG. 14 is a timing chart illustrating a second operation mode (single edge detection type QV conversion+IIR+integration circuit) of the detection circuit according to the second embodiment.

The sequence control circuit continuously controls a timing of turning on/off each of the input switch and the first to fifth switches of the detection circuit and a timing of discharging a part or the entirety of the second integration capacitor in synchronization with the plurality of pulses that are output to the drive circuit, and in synchronization with a timing when assuming that the pulses continue at a cycle as is in a period in which the pulses are not input (refer to FIGS. 13 and 14).

According to this embodiment, the switched capacitor circuit is constituted by the first switched capacitor circuit capable of operating as a finite impulse response (FIR) filter, the second switched capacitor circuit capable of operating as an infinite impulse response (IIR) filter, and the integration circuit. By performing the display drive and the touch detection in a time-division manner, the describe embodiments may increase the noise suppressing effect in comparison to an integration circuit of the related art.

[20] FIR (Dual Edge Type)+IIR+Integration Circuit

In the touch panel control circuit according to Section [19], the switched capacitor circuit has a configuration capable of performing control of inverting a connection direction of the first integration capacitor (refer to FIG. 16).

The sequence control circuit continuously controls a timing of turning on/off the input switch and the first switch of the detection circuit and a timing of discharging a part or the entirety of the second integration capacitor in synchronization with a rising edge and a falling edge of the plurality of pulses that are output to the drive circuit, in synchronization with timings in accordance with a rising edge and a falling edge when assuming that the pulses continue at a cycle as is in a period in which the pulses are not input.

The sequence control circuit inverts a connection direction of the first integration capacitor at a timing corresponding to a rising edge of the plurality of pulses and a rising edge when assuming that the pulses continue at a cycle as is in a period in which the pulses are not input, and a connection direction of the first integration capacitor at a timing corresponding to a falling edge of the plurality of pulses and a falling edge when assuming that the pulses continue at a cycle as is in a period in which the pulses are not input (refer to FIGS. 17 and 18) to each other.

According to this embodiment, the number of input times to an FIR filter may be doubled at a first stage in the same time period in comparison to the related art, and thus it is possible to improve touch detection sensitivity.

[21] Touch Panel Controller IC

A semiconductor integrated circuit according to a representative embodiment disclosed in this application is a semiconductor integrated circuit (3, 101, 102) including the touch panel control circuit (TPC, 3) according to any one of Sections [16] to [20] on a single semiconductor substrate.

According to this, a touch panel controller IC including a touch panel control circuit having high noise resistance is provided.

[22] Display Driver+Touch Panel Controller IC

The semiconductor integrated circuit (101, 102) according to Section [21] further includes a display drive circuit (DPC, 4), which is connected to a display panel configured to overlap the touch panel and which is capable of driving and controlling the display panel, on the semiconductor substrate.

According to this embodiment, a semiconductor integrated circuit (IC) is connected to a display and a touch panel, wherein the display panel and the touch panel are laminated and are integrally configured, and thus mutual cooperation of the display drive and touch sensing control is facilitated.

[23] Display Driver+Touch Panel Controller+Microcomputer IC

The semiconductor integrated circuit (102) according to Section [22] further includes a microcontroller (SMPU, 5), which is capable of controlling the touch panel control circuit and is capable of reading out data based on the output of the detection circuit, disposed on the semiconductor substrate.

According to this embodiment, a semiconductor integrated circuit (IC), in which the microcontroller is further integrated in the same chip, is provided. Thus, the mutual cooperation of the display drive and the touch sensing control is facilitated, and the burden of an application processor that is attached outside is reduced.

3. Further Detailed Description of the Embodiments

The embodiments will be described in more detail.

[First Embodiment] Detection Circuit that Continues Sampling Even in Period in which Y Sensor Electrode Drive Pulse is Stopped FIG. 1 illustrates an overall configuration of a display and input device 100 to which the embodiments of the present invention is applied as an example. The display and input device 100 shown in the same drawing is an example of electronic equipment relating to the invention, and constitutes, for example, a part of a portable terminal such as a personal digital assistant (PDA) and a cellular phone. The display and input device includes a touch panel (TP) 1, a display panel (DP) 2, a touch panel controller (TPC) 3, a display panel controller (DPC) 4, a sub-processor (SMPU) 5, and a host processor (HMPU) 6. The touch panel controller 3, the display panel controller 4, and the sub-processor 5 (as necessary) are formed as one semiconductor chip, or are mounted in one package, for example, as a multi-chip module, thereby realizing a single semiconductor device 101, 102. For example, when the touch panel controller 3 and the display panel controller 4 are mounted as one chip IC 101, the IC is connected to, for example, an in-cell type display and touch panel in which the display panel 2 and the touch panel 1 are stacked and are integrally configured, thus facilitating mutual cooperation of the display drive and touch sensing control. In addition, when the sub-processor (SMPU) 5 is integrated in the same chip 102, mutual cooperation of the display drive and the touch sensing control is further facilitated, and thus it is possible to reduce the burden of a host processor (HMPU) 6 that is attached outside.

The touch panel 1 is a mutual-capacitance type touch panel that is capable of realizing multi-touch detection, and includes a plurality of intersections that are constituted by a plurality of drive electrodes (Y sensor electrodes) and a plurality of detection electrodes (X sensor electrodes). A capacitive component (intersection capacitor) is formed at each of the intersections. The touch panel controller 3 supplies a sequential drive pulse to the drive electrodes, and according to this, detection data in accordance with a variation in the capacitive component at the intersections is obtained on the basis of signals that are sequentially obtained from the detection electrodes. The sub-processor (SMPU) 5 that is a microprocessor for a sub-system controls drive of the touch panel 1 and performs a process of detecting a touch state or coordinates from the detection data acquired by the touch panel controller 3. For example, the sub-processor 5 performs a digital filter operation with respect to the detection data, and position coordinates of an intersection at which a variation in capacitance occurs are calculated on the basis of data from which noise is removed by the digital filter operation. For example, to indicate the position of the intersections at which a stray capacitance varies, that is, a finger approaches (touches, or a contact event occurs) the position of the intersections, at which position coordinates when the contact event occurs, are calculated.

The touch panel 1 is constituted by using a transparent (light-transmitting) electrode or a dielectric film. In one example, the touch panel 1 is disposed on a display surface of the display panel 2 to overlap therewith. The touch panel 1 and the display panel 2 may have an in-cell configuration in which the touch panel 1 and the display panel 2 are integrally mounted, or may have a cover-glass-integrated configuration in which a touch panel 1 and a cover glass provided on an upper surface are integrally formed.

The host processor (HMPU) 6 generates display data, and the display panel controller 4 performs display control of displaying the display data received from the host processor 6 on the display panel 2. The host processor 6 acquires position coordinate data when the contact event occurs from the sub-processor 5, and analyzes an input by manipulation of the touch panel 1 from a relationship between the position coordinate data in the display panel 2 and a display screen that is displayed by the display panel controller 4.

Although not particularly limited, a communication control unit, an image processing unit, a voice processing unit, and an accelerator in addition to the units, which are not shown in the drawing, are embedded in the host processor 6, or are connected to the host processor 6, thereby constituting, for example, a portable terminal.

Figure 2:
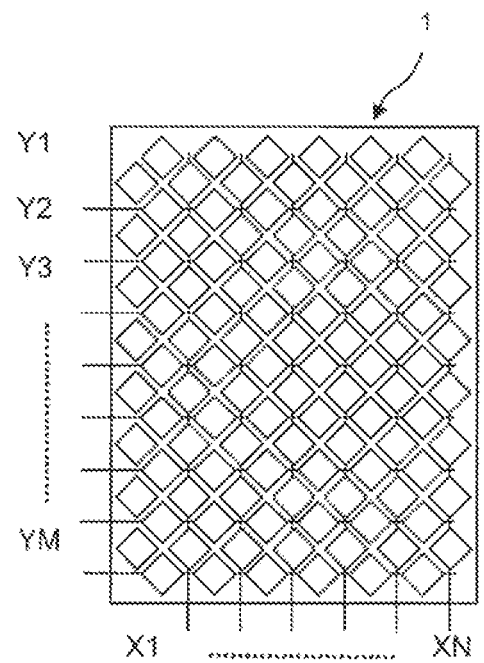
FIG. 2 is a plan view illustrating an electrode configuration of a touch panel.

FIG. 2 illustrates an electrode configuration of the touch panel 1 as an example. The touch panel 1 has a configuration in which the plurality of drive electrodes (Y sensor electrodes) Y1 to YM (also, described as Y sensor electrodes Ym) that are formed in a horizontal direction, and the plurality of detection electrodes (X sensor electrodes) X1 to XN (also, described as X sensor electrodes Xn) that are formed in a vertical direction are electrically insulated from each other. The intersection capacitor is formed at the intersections of the X sensor electrodes and the Y sensor electrodes through a capacitive electrode of each of the sensor electrodes. When an object such as a finger approaches the intersection capacitor, a stray capacitance, which occurs when the object constitutes a capacitive electrode, is added to a capacitance value of the intersection capacitor. For example, a drive pulse from the touch panel controller 3 is applied to the Y sensor electrodes Y1 to YM in the arrangement order thereof to drive these electrodes. FIG. 2 illustrates the touch panel 1 in which an electrode shape is a rhombic shape, but the electrode shape may be other shapes such as a lattice shape.

Figure 3:
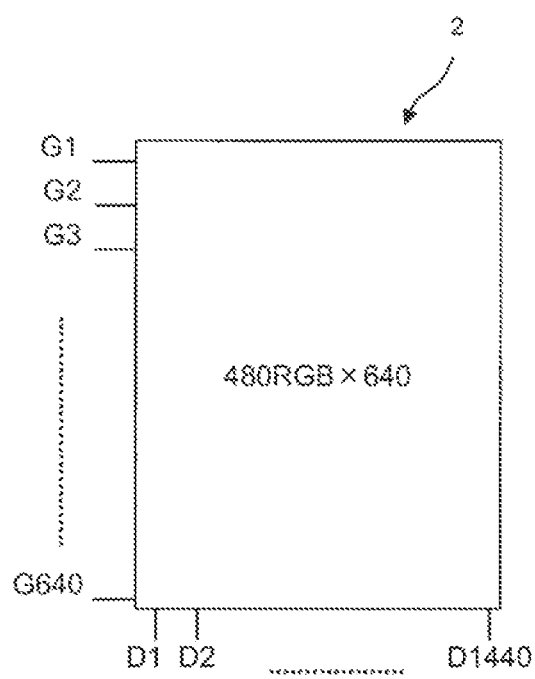
FIG. 3 is a plan view illustrating an electrode configuration of a display panel.

FIG. 3 illustrates an electrode configuration of the display panel 2. A display size of the display panel 2 which is shown in the same drawing is, for example, a size of 480 RGB×640 that is VGA. In the display panel 2, gate electrodes G1 to G640 as scanning electrodes that are formed in a horizontal direction and drain electrodes D1 to D1440 as signal electrodes that are formed in a vertical direction are disposed, a selection terminal is connected to a corresponding scanning electrode at intersections of the gate electrodes and the drain electrodes, and a plurality of display cells in which an input terminal is connected to a corresponding signal electrode are disposed. For example, a scanning pulse is supplied to the gate electrodes G1 to G640 from the display panel controller 4 in the arrangement order of the gate electrodes to drive (scanning-drive) the gate electrodes G1 to G640. Grayscale data of a scanning drive line is applied to the drain electrodes D1 to D1440 in synchronization with the scanning drive of the gate electrode. The display size of the display panel 2 is arbitrary and not limited to the illustrated display size.

Figure 4:
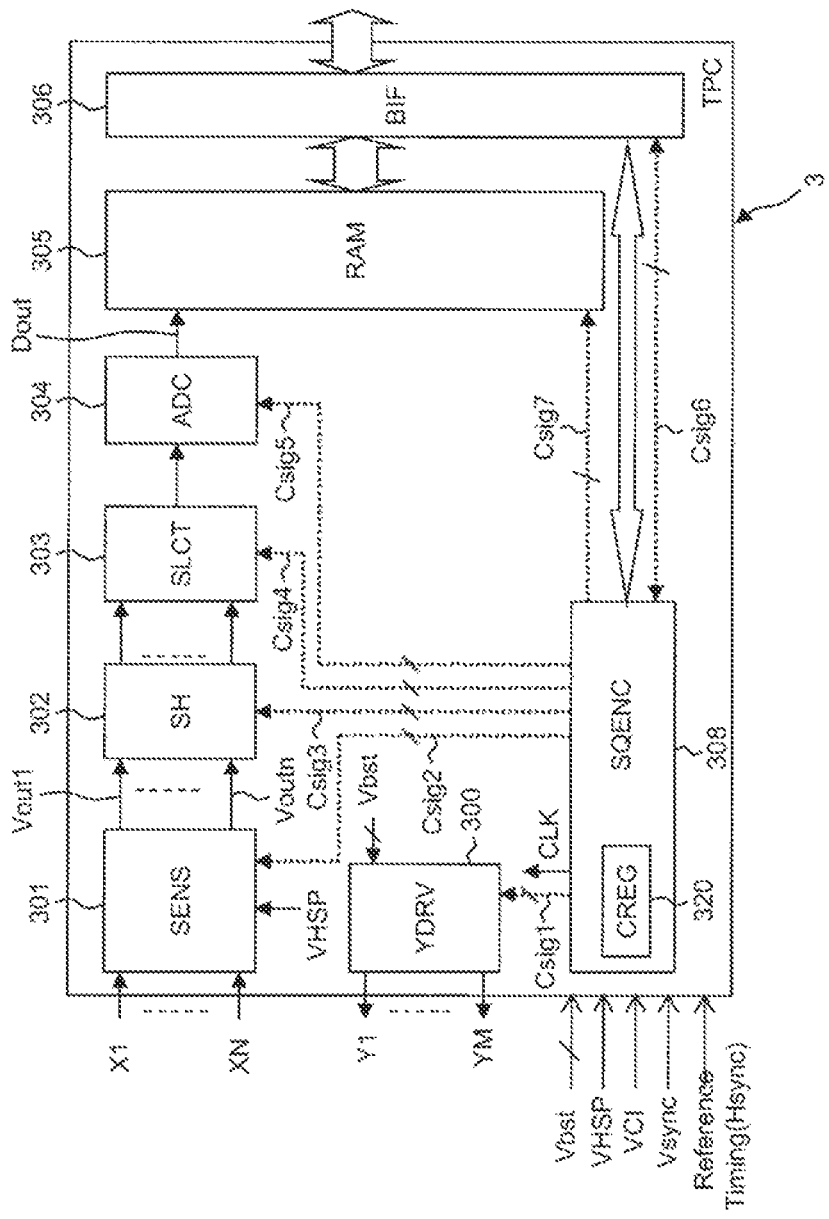
FIG. 4 is a block diagram illustrating an overall configuration of a touch panel controller.

FIG. 4 illustrates an overall configuration of the touch panel controller 3. The touch panel controller 3 includes a drive circuit (YDRV) 300, a detection circuit (SENS) 301, a sample-and-hold circuit (SH) 302, a selector (SLCT) 303, an analog/digital conversion circuit (ADC; hereinafter, abbreviated as an AD conversion circuit) 304, a random access memory (RAM) 305, a bus interface circuit (BIF) 306, and a sequence control circuit (SQENC) 308 as a control circuit. In some embodiments, it may be desirable that the sequence control circuit (SQENC) 308 includes a control register (CREG) 320 which can set a control sequence in a programmable manner. The control resistor (CREG) 320 may be comprised of a nonvolatile storage element, or may be comprised of a volatile storage element and have a configuration in which initialization or appropriate modification thereof can be performed by the sub-processor (SMPU) 5.

The drive circuit 300 repeats an operation of sequentially outputting a drive pulse to the Y sensor electrodes Y1 to YM to detect touching at a predetermined timing. The drive pulse that is supplied for each of the Y sensor electrodes is controlled to have a constant number of plural pulses. A signal, which is synchronized with the drive pulse through an intersection capacitor, is shown in the X sensor electrodes X1 to XN. When a finger of a user or the like comes into contact with or approaches the intersection capacitor, an electric charge that is charged in the intersection capacitor is removed from the drive pulse. A signal, which is generated in association with migration of an electric charge generated in the X sensor electrodes X1 to XN in synchronization with the drive pulse, is an input to the detection circuit 301. The detection circuit 301 includes a switched capacitor circuit to which an input signal from the X sensor electrodes is input. Detection signals Vout1 to Voutn which are output from the detection circuit 301 are retained in the sample-and-hold circuit 302 for each detection electrode, the detection signals that are retained are selected by the selector 303, and the detection signals that are selected are converted into digital detection data Dout by the AD conversion circuit 304. The detection data that is converted is stored in the RAM 305. The detection data that is stored in the RAM 305 is supplied to the sub-processor 5 through the bus interface circuit 306, and is used in the calculation of touch coordinates.

The sequence control circuit 308 controls operations of the drive circuit 300, the detection circuit 301, the sample-and-hold circuit 302, the selector 303, the AD conversion circuit 304, and the bus interface circuit 306 by using control signals Csig1 to Csig6, and performs access control of the RAM 305 with a control signal Csig7. In addition, although not particularly limited, a pulse voltage Vbst of a drive pulse that is output to the Y sensor electrodes by the drive circuit 300, an initialization voltage (pre-charge voltage) VHSP of the X sensor electrodes which is input by the detection circuit 301, and a power supply voltage VCI are supplied from the outside of the touch panel controller 3.

Figure 5:
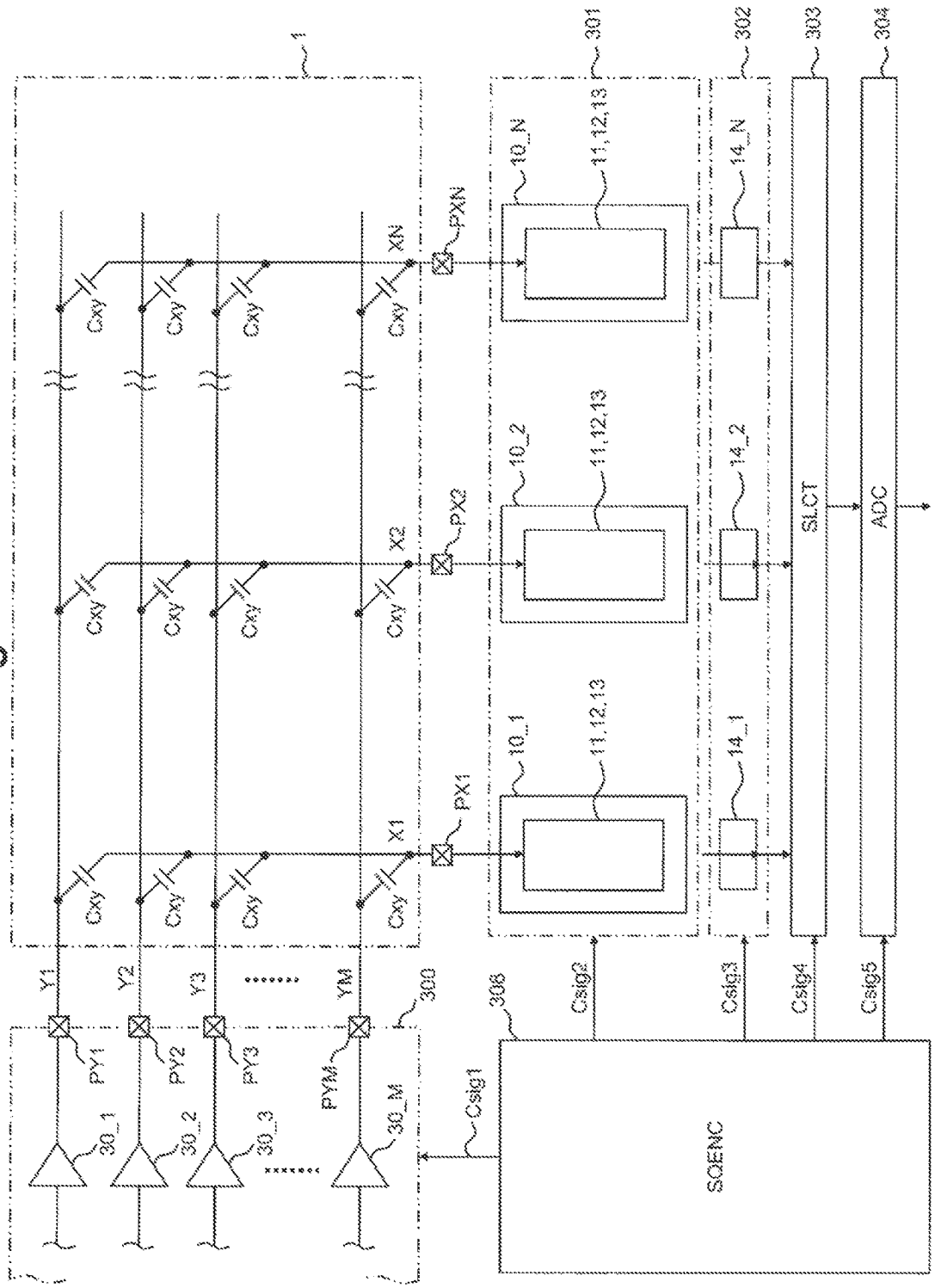
FIG. 5 is a block diagram illustrating an example of an equivalent circuit and a detection circuit of the touch panel.

FIG. 5 illustrates an example of an equivalent circuit and the detection circuit 301 of the touch panel 1. In the touch panel 1, the Y sensor electrodes Y1 to YM and the X sensor electrodes X1 to XN are arranged in a matrix shape, and an intersection capacitor (mutual capacitor) Cxy is formed at each of intersections of the X sensor electrodes and the Y sensor electrodes. The drive circuit 300 includes drive amplifiers 30_1 to 30_M, which supply a drive pulse with respect to the Y sensor electrodes Y1 to YM on the basis of the control signal Csig1.

The detection circuit 301 includes detection circuits 10_1 to 10_N that correspond to the X sensor electrodes X1 to XN, respectively. When a pulse is applied to the Y sensor electrodes, electric charges corresponding to the intersection capacitors Cxy are input in parallel with each other to the detection circuits 10_1 to 10_N from the X sensor electrodes X1 to XN. Each of the detection circuits 10_1 to 10_N includes switched capacitor circuits 11, 12, and 13. Outputs of the detection circuits 10_1 to 10_N are transmitted to the sample-and-hold circuits 14_1 to 14_N, respectively, and are retained as a voltage value. The selector (SLCT) 303 sequentially selects each of the voltage values that are retained in the sample-and-hold circuits 14_1 to 14_N on the basis of the control signal Csig4 and inputs the voltage value that is selected to the AD conversion circuit 304. In addition, in this specification, when indicating individual detection circuits corresponding to the X sensor electrodes, a reference number 10 or reference numerals 10_1 to 10_N are used, and when indicating the entirety of the detection circuits including the detection circuits 10_1 to 10_N, a reference numeral 301 is used. Similarly, when indicating individual sample-and-hold circuits corresponding to the X sensor electrodes, a reference numeral 14 or reference numerals 14_1 to 14_N are used, and when indicating the entirety of the sample-and-hold circuits including the sample-and-hold circuits 14_1 to 14_N, a reference numeral 302 is used.

The detection circuit 10 of the invention includes the switched capacitor circuits 11, 12, and 13 which perform sampling of a signal from each of the X sensor electrodes to which the detection circuit 10 is connected not only at a timing that is in synchronization with the plurality of pulses that are applied to the Y sensor electrodes, but also at a timing at which the pulses are not applied to the Y sensor electrodes. For example, the switched capacitor circuit is an integration circuit 13, or an integration circuit in which switched capacitor filters 11 and 12 are provided in front of the integration circuit.

Accordingly, embodiments of the present disclosure are able to obtain a noise suppressing effect higher than that in the related art. A touch detection circuit of the related art performs a sampling operation whenever a pulse that drives the Y sensor electrode is applied. For example, in the related art (e.g., as shown in FIG. 5 of Japanese Patent Application No. JP-A-2012-234474), an integration circuit is directly connected to X sensor electrodes, and performs a sampling operation of integrating a signal charge that is input whenever a pulse is applied to Y sensor electrodes. At this time, application of a pulse to the Y sensor electrodes is stopped in the display period, and the sampling operation is also stopped. Similar behavior has been observed in a display device (such as disclosed in Japanese Patent Application No. JP-A-2012-59265), in a case of dividing a display panel operating period and a touch sensing period in a time division manner so as to prevent a display drive signal from having an effect as noise with respect to touch detection.

In contrast, according to embodiments of the present disclosure, in the touch panel controller 3 of the invention, a pulse operation to the Y sensor electrodes is intermittently performed so as to be stopped in the display drive period of the display panel 2. In addition, sampling by the switched capacitor circuit included in the detection circuit 10 continues even in a period in which the pulse is not applied to the Y sensor electrodes. According to this, in a case of performing display drive and touch detection in a time-division manner, it is possible to increase the noise suppressing effect. The principle thereof will be described below in detail.

An operation of the touch panel controller 3 of the invention will be described in more detail.

Figure 6:
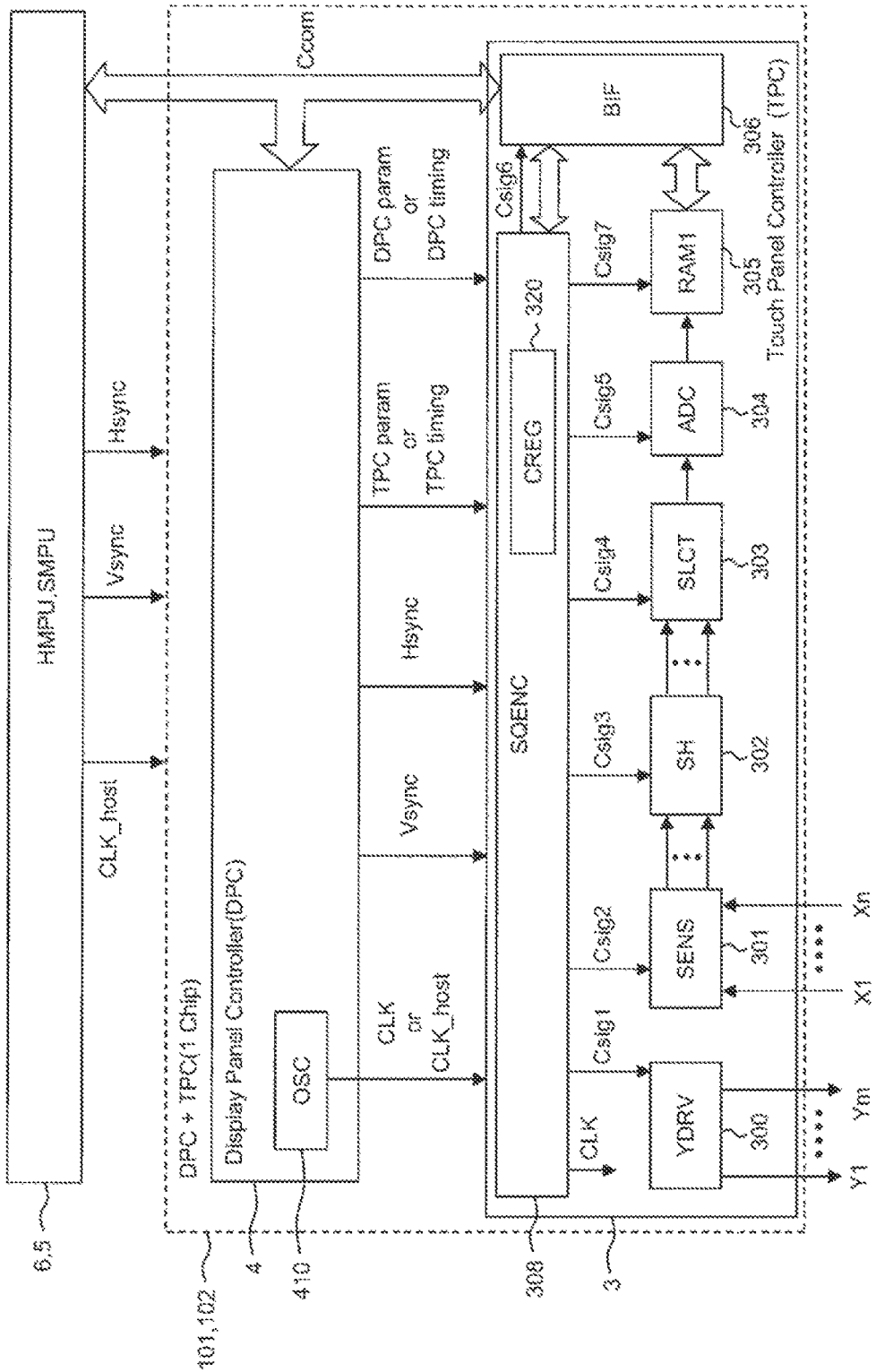
FIG. 6 is a block diagram illustrating an example of a configuration of a display and input device that includes a touch panel controller of the invention.

FIG. 6 is a block diagram illustrating a configuration of a display and input device 100 that includes the touch panel controller 3 of the invention. The display device 100 includes an IC 101 that includes the touch panel controller 3 and the display panel controller 4 in a single chip, the host processor (HMPU) 6, the sub-processor (SMPU) 5, and the like. The sub-processor (SMPU) 5 may be configured as an IC 102 that is integrated in the same chip. A clock signal CLK_host, a vertical synchronization signal Vsync that is an externally synchronized timing signal, and a horizontal synchronization signal Hsync are supplied to the IC 101 or IC 102 from the host processor (HMPU) 6. A communication path Ccom is provided to each of the touch panel controller 3 and the display panel controller 4 to supply a control command or a control parameter, display data, and the like in a direct manner or through the sub-processor (SMPU) 5, and to receive touch detection data and the like. A clock signal CLK, the vertical synchronization signal Vsync, the horizontal synchronization signal Hsync, and timing information that is used to perform display drive and touch detection in a time-division manner are supplied to the touch panel controller 3. The clock signal CLK_host may be input supplied from the host processor (HMPU) 6, and the clock signal CLK may be oscillated, generated in, and supplied from an oscillation circuit (OSC) 410 embedded in the display panel controller 4. Instead of the vertical synchronization signal Vsync and the horizontal synchronization signal Hsync, a display timing signal (DPCtiming) or a touch detection timing signal (TPCtiming) may be supplied to the touch panel controller 3. The display timing signal (DPCtiming) or the touch detection timing signal (TPCtiming) can be generated from the horizontal synchronization signal Hsync in the display panel controller 4. As timing information that is used to perform the display drive and the touch detection in a time-division manner, one or both of display timing information (DPCparam) indicating a period in which the display panel controller 4 performs the display drive, and touch detection timing information (TPCparam) indicating a period in which the display panel controller 4 stops the display drive are supplied. The display timing information and the touch detection timing information may be, for example, parameters that are specified on the basis of the horizontal synchronization signal Hsync or the display timing signal (DPCtiming), or the touch detection timing signal (TPCtiming). The parameter that specifies the timing information is stored in a control register 320 that can be provided to the sequence control circuit (SQENC) 308 inside the touch panel controller 3. FIG. 6 illustrates an example in which the display panel controller 4 includes the oscillation circuit (OSC) 410 that generates a clock signal, but in other embodiments, a clock generation circuit may be provided on a touch panel controller 3 side. The display panel controller 4 and the touch panel controller 3 can operate in a non-synchronized manner to each other, and timing signals such as the vertical synchronization signal Vsync and the horizontal synchronization signal Hsync are subjected to a synchronization process when being received or transmitted.

In the touch panel controller 3, the sequence control circuit 308 is comprised of, for example, a circuit that operates in synchronization with a clock signal CLK that is input, and controls operations of the drive circuit 300, the detection circuit 301, the sample-and-hold circuit 302, the selector 303, the AD conversion circuit 304, the bus interface circuit 306, and the RAM 305 by using control signals Csig1 to Csig7. Particularly, the control signals Csig1 to Csig3, which control the drive circuit 300, the detection circuit 301, and the sample-and-hold circuit 302, allow these circuits to operate in synchronization with each other, and thus it may be desirable to perform control in synchronization with the same clock signal CLK. According to this, a configuration of a circuit, which synchronizes the timing of outputting a pulse that drives the Y sensor electrodes from the drive circuit 300, and the timing of inputting a signal charge from the detection circuit 301 and the X sensor electrodes of a subsequent stage and the processing timing of the signal charge, becomes simple. Other configurations and operations are the same as those described above with reference to FIG. 4, and thus description thereof will not be repeated.

Figure 7:
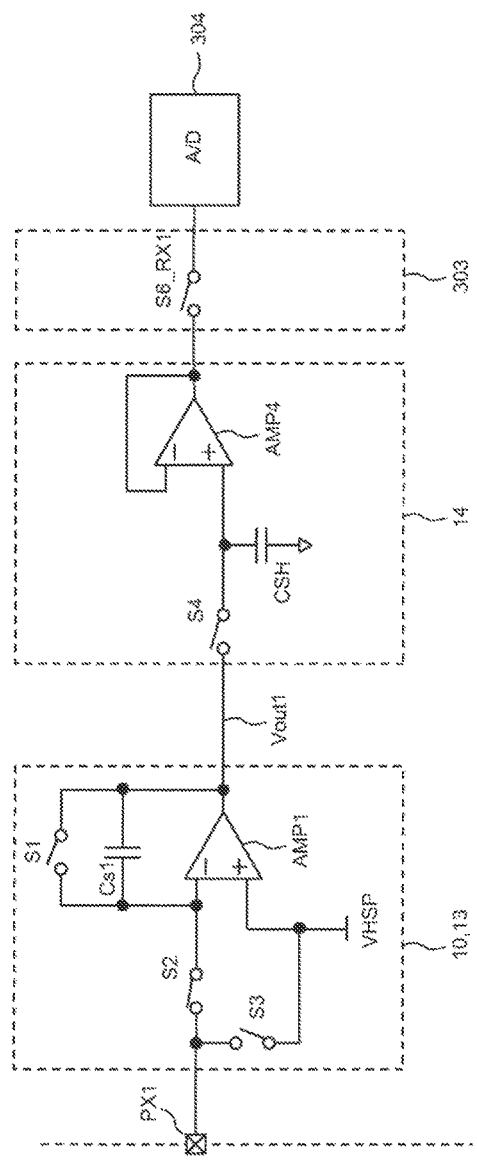
FIG. 7 is a circuit diagram illustrating a configuration example of an integration circuit that is an example of a switched capacitor circuit that is included in the detection circuit.

FIG. 7 is a circuit diagram illustrating a configuration example of an integration circuit that is an example of the switched capacitor circuits included in the detection circuit 301. The detection circuit 10 is connected to the input terminal PX1, the sample-and-hold circuit 14 is connected to an output of the detection circuit 10, and an output of the sample-and-hold circuit 14 is connected to the AD conversion circuit 304 through the selector 303. The detection circuit 10 includes a switched capacitor circuit that is configured as an integration circuit 13. The integration circuit 13 includes an operational amplifier AMP1 in which a positive side input (+) is fixed to a predetermined potential VHSP, and an integration capacitor Cs1 and a switch S1 are connected in parallel with each other between a negative side input (−) and an output Vout1 of the operational amplifier AMP1. A switch S2 is connected to between an input terminal PX1 and the negative side input (−) of the operational amplifier AMP1. The input terminal PX1 can be initialized to the predetermined potential VHSP by a switch S3. For example, even when application of a pulse that drives the Y sensor electrodes and the timing of the switch S2 deviate from each other, the potential of the X sensor electrodes can be initialized to the predetermined potential VHSP by the switch S3. In the integration circuit 13, when the switch S1 is closed, the integration capacitor Cs1 is discharged and initialized. Whenever the switch S2 is closed, the integration circuit 13 performs an integration operation of cumulatively adding an electric charge input from the X sensor electrodes by the integration capacitor Cs1. The sample-and-hold circuit 14 includes a switch S4, a sample-and-hold capacitor CSH, and an operational amplifier AMP4. A negative side input (−) and an output terminal are short-circuited, and thus the operational amplifier AMP4 constitutes a voltage follower amplifier. A positive side input (+) of the operational amplifier AMP4, which is an input of the voltage follower amplifier, is connected to the sample-and-hold capacitor CSH between the positive side input and a ground potential, and is connected to the switch S4 between the positive side input and the output Vout1 of the integration circuit 13 that is the detection circuit 10. The switches S1 to S3 are controlled by the control signal Csig2, and the switch S4 is controlled by the control signal Csig3.

Figure 8:
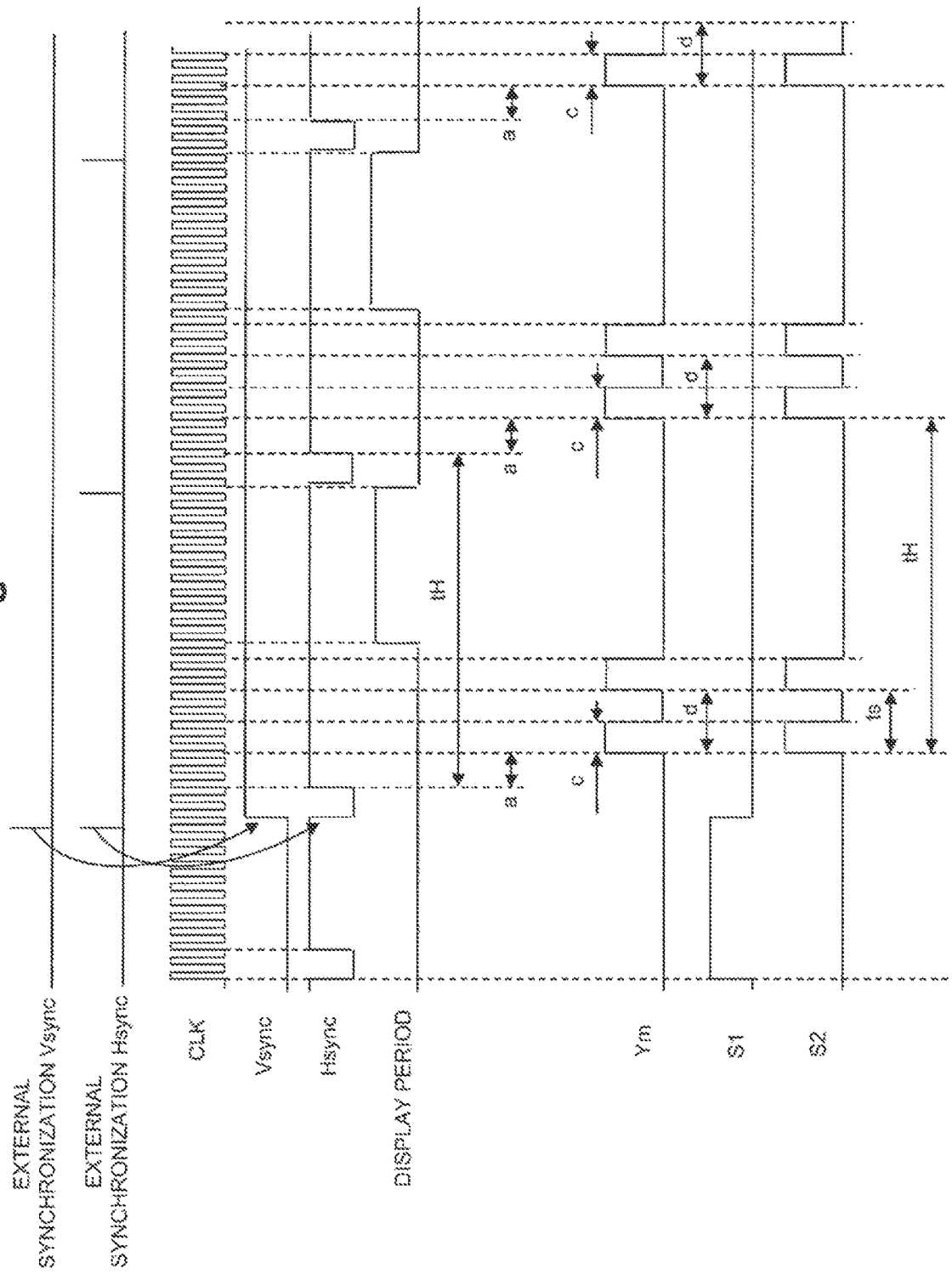
FIG. 8 is a timing chart illustrating an operation example of a touch panel controller in the related art.

FIG. 8 is a timing chart illustrating an operation example of a touch panel controller of the related art. Time is shown on the horizontal axis. Externally synchronized vertical synchronization signal Vsync and externally synchronized horizontal synchronization signal Hsync, the clock signal CLK, the vertical synchronization signal Vsync and the horizontal synchronization signal Hsync inside the IC 101, a signal indicating a display period, a signal Ym that is applied to the Y sensor electrodes, and signals that control the switches S1 and S2 are shown on the vertical axis in this order from an upper side thereof. The internal vertical synchronization signal Vsync and the horizontal synchronization signal Hsync are generated in synchronization with the externally synchronized vertical synchronization signal Vsync and horizontal synchronization signal Hsync, respectively. The internal vertical synchronization signal Vsync is configured to rise in synchronization with the externally synchronized vertical synchronization signal Vsync, and the internal horizontal synchronization signal Hsync is configured, for example, to fall in synchronization with the externally synchronized horizontal synchronization signal Hsync and to rise after a predetermined period, which is in synchronization with the clock signal CLK, for synchronization with the clock signal CLK.

As shown in the same drawing, the display period is provided at a part of one line period "tH" (the later half in the drawing), and in a case where touch detection is performed before initiation of the display period, a pulse applied to the sensor electrodes Ym rises after a predetermined period "a" from the rising of the Hsync, and is repetitively output before initiation of the display period in a high period "c" and at a cycle "d". FIG. 8 illustrates an example in which two pulses are output for every one line, but the number of pulses varies according to the length of the display period in the one line period "tH". When the display period is lengthened, a period capable of being allocated to the touch detection is shortened, and thus touch detection sensitivity and accuracy decrease. It is necessary for the display panel 2 and the display panel controller 4 to respond at a high speed so as to shorten the display period. A control signal of the switch S1 becomes "high" before the initiation of application of a series of pulses to the sensor electrodes Ym, and returns to "low". Accordingly, the integration capacitor Cs1 of the integration circuit 13 is short-circuited and discharged, and is initialized. The control signal of the switch S1 is controlled in synchronization with the application of the series of pulses to the sensor electrodes Ym. That is, the control signal rises after the predetermined period "a" from the rising of the Hsync, and is repetitively output before initiation of the display period at a cycle "ts". It is not necessary for the length of the high period to be made to be equal to a high period "c" of a pulse that is applied to the Y sensor electrodes. Electric charges generated when pulses are applied to the sensor electrodes Ym are taken into the integration circuit 13 by closing the switch S2, and signal charges, which are integrated a predetermined number of times, that is, which are repetitively taken in, are accumulatively added in the integration capacitor Cs1. In the display period, application of a pulse to the sensor electrodes Ym is stopped, and thus the switch S2, which controls input to the integration circuit 13 that operates in synchronization with the application, is also opened in the period, and thus operation of the integration circuit 13 is stopped. Input to the integration circuit 13 is stopped in the display period, but an integration value is retained in the integration capacitor Cs1. Accordingly, when the input restarts, the integration operation restarts, and thus signal charges are integrated in correspondence with input of a predetermined number of pulses. As described above, the switched capacitor circuit that is included in the detection circuit 301 intermittently operates in the sampling cycle "ts". In addition, "high/low" of the signals shown in FIG. 8 is illustrative only, and is appropriately defined in accordance with the positive logic and the negative logic of a circuit that is constructed. This is also true of other timing charts.

FIG. 9 is a timing chart illustrating an operation example of the touch panel controller of the invention. Time is shown on the horizontal axis. The externally synchronized vertical synchronization signal Vsync and horizontal synchronization signal Hsync, the clock signal CLK, the vertical synchronization signal Vsync and the horizontal synchronization signal Hsync inside the IC 101, the signal indicating a display period, a signal ("Touch window") indicating a touch window, a signal that is applied to the Y sensor electrodes Ym, and signals that control the switches S1 and S2 are shown on the vertical axis in this order from an upper side thereof. The externally synchronized vertical synchronization signal Vsync and horizontal synchronization signal Hsync, the clock signal CLK, the vertical synchronization signal Vsync and the horizontal synchronization signal Hsync inside the IC 101, the signal indicating the display period, and the signal applied to the Y sensor electrodes Ym, and the operation of the switch S1 are the same as those in the operation example of the touch panel controller of the related art which is described with reference to FIG. 8, and thus description thereof will not be repeated.

In FIG. 9, the touch window as timing information indicating the touch detection period is shown. The touch window is set in a range not overlapping the display period, and is a signal indicating a period in which the touch panel controller is allowed to operate a touch detection operation. The touch window may rise after the period "a" from the rising of the internal horizontal synchronization signal Hsync, and may fall after "b+β (β<0)" with a margin "β" in comparison to falling after a period "b" from the rising of the Hsync at which the display period is initiated. For example, the touch window is input as a timing signal TPCtiming from the display panel controller 4, or is generated in the sequence control circuit (SQENC) by applying "a", "b", and "β" to the control register 320 as parameters. Output of the pulse applied to the Y sensor electrodes Ym is limited to a range of the touch window. According to this, it is possible to adjust the margin in such a manner that the Y sensor electrode drive pulse does not have an effect on display data in the display period and does not deteriorate image quality.

A notable configuration of embodiments of the present invention is in the operation of the switch S2. In the operation example of the related art which is shown in FIG. 8, the switch S2 is opened in the display period in synchronization with the pulse applied to the sensor electrodes Ym.

In contrast, in the invention, as shown in FIG. 9, the taking-in of a signal charge from the X sensor electrodes continues at the same cycle "ts" even in a period in which output of the pulse to the sensor electrode Ym is stopped. Since the operation of the detection circuit 301 continues even in the display period, but the output of the pulse to the sensor electrodes Ym is stopped, the display data is not affected and thus the image quality does not deteriorate. According to embodiments, frequency characteristics of the switched capacitor circuit that is a detection circuit are significantly improved as follows.

Figure 10:
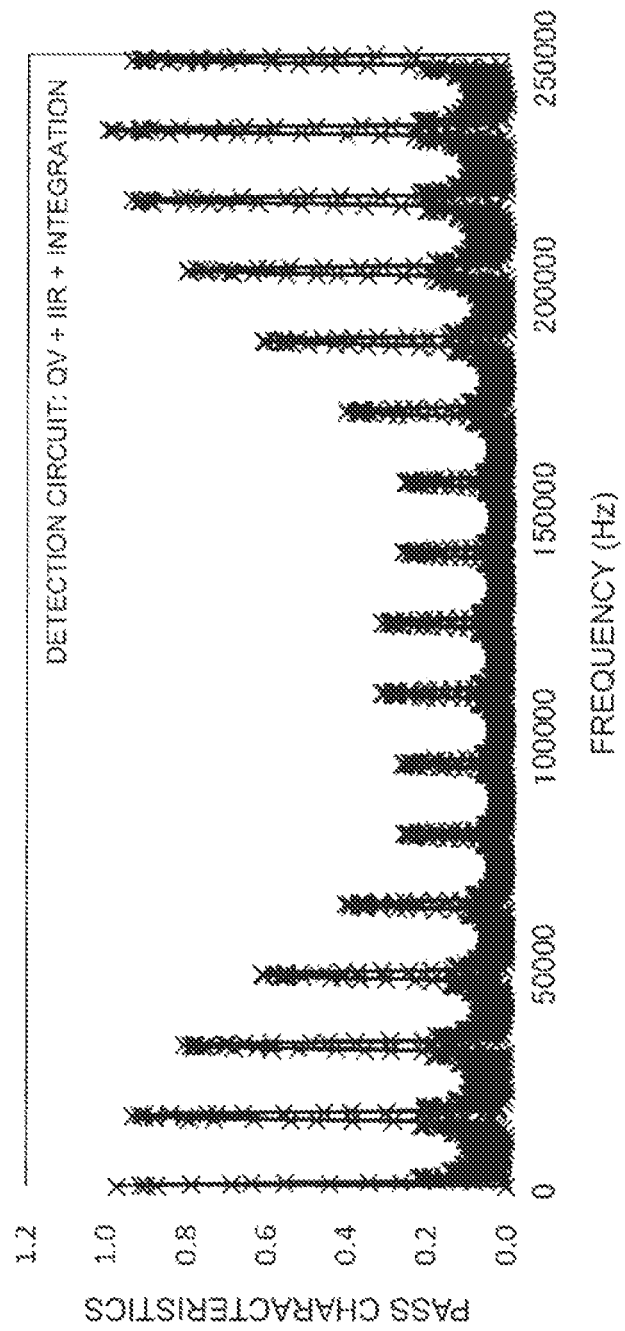
FIG. 10 is a graph illustrating frequency characteristics of a detection circuit in the related art.
Figure 11:
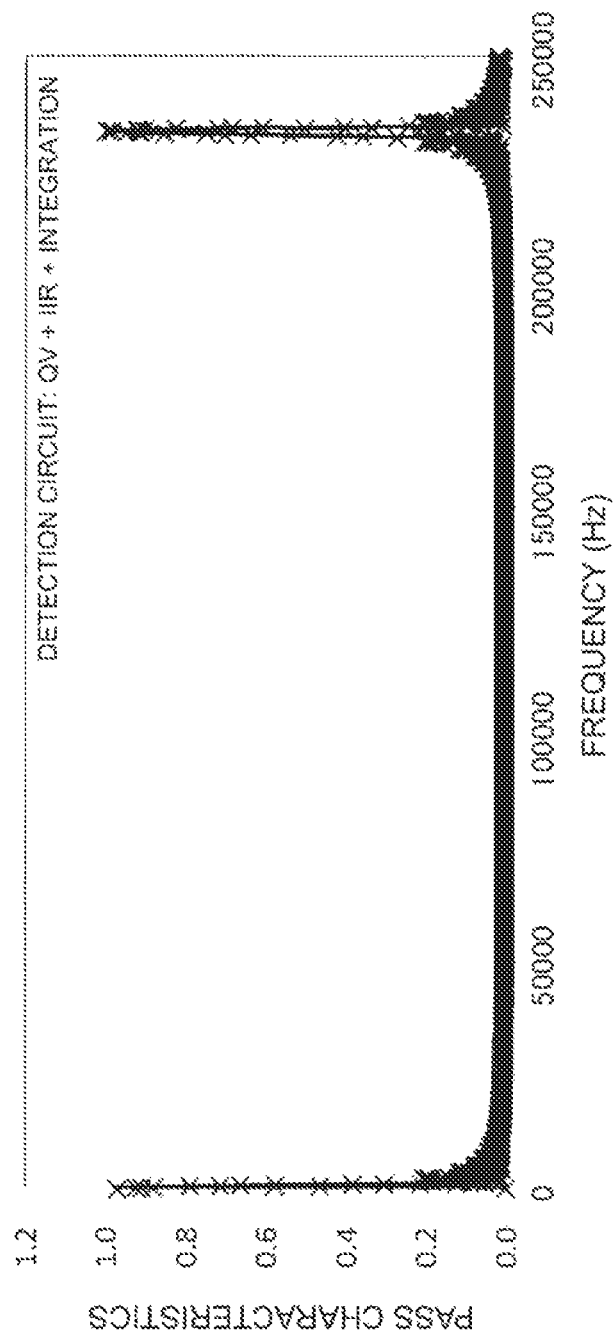
FIG. 11 is a graph illustrating frequency characteristics of a detection circuit of the invention.

FIGS. 10 and 11 are graphs illustrating frequency characteristics of the detection circuit of the related art and the embodiments of the present invention, respectively. The frequency is shown on the horizontal axis, and pass characteristics of the switched capacitor circuit included in the detection circuit 10 are shown on the vertical axis. The description made with reference to FIGS. 6 to 9 is given as an example, in which the switched capacitor circuit is comprised of only the integration circuit 13, for sake of comprehension. The frequency characteristics shown in FIGS. 10 and 11 correspond to a case where the switched capacitor circuit included in the detection circuit 10 has a configuration in which a QV conversion circuit, an IIR (infinite impulse response) filter, and an integration circuit are cascade-connected. A circuit configuration and an operation will be described in detail in a second embodiment to be described later, and the switched capacitor circuit is designed to have low-pass characteristics in which the gain is 1 (no attenuation) at a frequency of 0. The switched capacitor circuit is a discrete system, and thus has periodic frequency characteristics which are folded back with a unit of a sampling frequency that is a reciprocal of the cycle "ts". FIGS. 10 and 11 illustrate frequency characteristics of a case where the sampling frequency is approximately 230 kHz. The following finding has been obtained.

As described above, when an operation of the switched capacitor circuit that comprises the detection circuit 10 of the related art is stopped in the display period, the switched capacitor circuit has the frequency characteristics shown in FIG. 10. Pass characteristics which have a gain of 1 (no attenuation) at a frequency of 0 and a sampling frequency of approximately 230 kHz are the same as designed low-pass characteristics. However, the switched capacitor circuit intermittently operates at a cycle "tH" of the horizontal synchronization signal in synchronization with the display period, and thus it can be seen that pass characteristics have a peak overlap with each other for every frequency of the reciprocal of the cycle "tH". As described above, the touch detection uses the following phenomenon. Specifically, when a user's finger comes into contact with or approaches an X sensor electrode and a pulse is applied to a Y sensor electrode, the amount of electric charges that migrate from the intersection capacitor Cxy to the X sensor electrode decreases in comparison to the amount during non-touching. At this time, various kinds of external noise are mixed-in to the X sensor electrode due to a user's body serving as an antenna with respect to external noise, or a potential difference occurring between the touch panel and the user's body. The switched capacitor circuit is configured to have the low-pass characteristics so as to suppress (remove) the external noises. However, as shown in FIG. 10, it can be seen that pass characteristic peaks to be originally suppressed occur at a cycle of a frequency 1/tH even in a frequency band between the frequency of 0 and the sampling frequency (approximately 230 kHz) due to an intermittent operation.

In contrast, in the embodiments of the present invention, as shown in FIG. 9, the switch S2 is allowed to continuously operate even in the display period, and a sampling operation continues at a cycle "ts". According to such embodiments, as shown in FIG. 11, the pass characteristics of the switched capacitor circuit have pass characteristics having a gain=1 (no attenuation) only at the frequency of 0 and the sampling frequency (approximately 230 kHz). In frequency bands between the frequencies, pass characteristics are suppressed to approximately 0. According to this, it is possible to significantly improve the noise suppressing effect.

The switched capacitor circuit that comprises the detection circuit 10 is a switched capacitor circuit that operates at a sampling cycle that synchronizes with a pulse applied to the Y sensor electrode at the same cycle. In addition, application of a pulse to the Y sensor electrodes occurs intermittently, but the sampling continues even in the period in which the application of the pulse is stopped. According to this configuration, a problem of embodiments of the present invention is solved. Various modifications can be made to the switched capacitor circuit in a range not changing the scope of the present invention, and thus the switched capacitor circuit can be configured by the integration circuit, the switched capacitor filter circuit, the QV conversion circuit, and a combination of these circuits. As an example thereof, a second embodiment and a third embodiment can be exemplified.

[Second Embodiment] Programmable SCF (Single Edge Detection Type)

A more detailed configuration example of the detection circuit 10 according to an embodiment of the invention will be described.

FIG. 12 is a circuit diagram illustrating a configuration example of a detection circuit (single edge detection type) according to a second embodiment. FIG. 12 illustrates an example of a circuit configuration in which the detection circuit 301, the sample-and-hold circuit 302, and the selector 303 are connected to one detection electrode (X sensor electrode). For example, these components are connected to the detection electrode (X sensor electrode) X1 through a terminal PX1. The detection circuit 10_1 that is connected to one detection electrode (X1) includes first and second switched capacitor circuits 11 and 12, and an integration circuit 13. An output of the first switched capacitor circuit 11 is transmitted to the second switched capacitor circuit 12 through a switch S41 and a sample-and-hold capacitor Csh1. An output of the second switched capacitor circuit 12 is transmitted to the integration circuit 13 through a switch S43 and a sample-and-hold capacitor Csh2. An output of the integration circuit 13 is connected to one sample-and-hold circuit 14, which constitutes the sample-and-hold circuit 302, through the switch S4. An output of the sample-and-hold circuit 14 is connected to the AD conversion circuit 304 through one switch S6_RX1 that constitutes the selector 303. An output of the first switched capacitor circuit 11 may be connected to a switch S4, which is an input of the sample-and-hold circuit 14, through a switch SITG. The output of the first switched capacitor circuit 11 may be transmitted to the sample-and-hold circuit 14 by stopping operations of the second switched capacitor circuit 12 and the integration circuit 13 and by by-passing these circuits. The integration circuit 13 has a configuration in which when an operation thereof is stopped, an output VOUT3 becomes a high impedance. The above-described respective switches, and respective switches, which are described later, in the first and second switched capacitor circuits 11 and 12 and the integration circuit 13 are controlled by the control signals Csig2 to Csig4 that are output from the sequence control circuit 308.

The first switched capacitor circuit 11 includes an operational amplifier AMP1 in which a positive side input (+) is fixed to a predetermined potential (VHSP). An integration capacitor Cs1 and a switch S1 are connected in parallel with each other between a negative side input (−) and an output VOUT1 of the operational amplifier AMP1. A switch S2 is connected to between the input terminal PX1 and the negative side input (−) of the operational amplifier AMP1. The input terminal PX1 may be fixed to the predetermined potential VHSP with a switch S3. For example, the input terminal PX1 can be fixed to the predetermined potential VHSP with the switch S3 in order for a potential of the X sensor electrodes not to vary even when application of a pulse that drives the Y sensor electrodes and a timing of the switch S2 deviate from each other. As described later, the first switched capacitor circuit 11 can be allowed to operate as a finite impulse response (FIR) filter, a QV converter, or an integration circuit by appropriately controlling the timing of the switches S1 to S3, and the switch S41 that controls transmission to the sample-and-hold capacitor Csh1 of a subsequent stage.

The second switched capacitor circuit 12 includes an operational amplifier AMP2 having a configuration in which a positive side input (+) is fixed to a predetermined potential VHSP. Integration capacitors Cs2a and Cs2b and a switch S12 are connected in parallel with each other between a negative side input (−) and an output VOUT2 of the operational amplifier AMP2. The integration capacitors Cs2a and Cs2b are connected in parallel with each other or are separated from each other by switches CF1 and CF2. One or both of the integration capacitors Cs2a and Cs2b are configured to be short-circuited and discharged by the switch S12 and to be initialized to the predetermined potential VHSP by a switch S13. That is, the integration capacitors Cs2a and Cs2b are configured in such a manner that a part (only Cs2b) or the entirety (Cs2a+Cs2b) of a capacitance value can be discharged by control of the switches CF1, CF2, and S12. A switch S42 is connected to between the sample-and-hold capacitor Csh1 and the negative side input (−) of the operational amplifier AMP2. As described later, the second switched capacitor circuit 12 can be allowed to operate as an IIR filter by appropriately controlling timings of the switch S42 that controls an input from the sample-and-hold capacitor Csh1, the switches S12, S13, CF1, and CF2, and the switch S43 that controls transmission to a sample-and-hold capacitor Csh2 of a subsequent stage. It is preferable that the capacitance values of the integration capacitors Cs2a and Cs2b are configured to be changed, for example, by register setting. This is because frequency characteristics of the IIR filter are defined by the capacitance values of the integration capacitors Cs2a and Cs2b.

The integration circuit 13 includes an operational amplifier AMP3 in which a positive side input (+) is fixed to a predetermined potential VHSP. An integration capacitor Cs3 and a switch S14 are connected in parallel with each other between a negative side input (−) and an output VOUT3 of the operational amplifier AMP3. A switch S44 is connected to between the sample-and-hold capacitor Csh2 and a negative side input (−) of the operational amplifier AMP3. It is preferable that a capacitance value of the integration capacitor Cs3 is configured to be changed, for example, by resistor setting. This is because in the integration circuit 13, an amplification effect can be obtained by a ratio between the sample-and-hold capacitor Csh2 and the integration capacitor Cs3, and thus an amplification rate can be adjusted by setting the capacitance value of the integration capacitor Cs3 to be variable. In addition, it is preferable that the number of times of operation of the integration circuit 13, that is, the number of times of piling-up is configured to be changed, for example, by resistor setting. This is because the amplification rate can also be adjusted by the number of times of operation of the integration circuit 13.

The sample-and-hold circuit 14 is constituted by an input switch S4, a sample-and-hold capacitor CSH, and a voltage follower amplifier using an operational amplifier AMP4.

The detection circuit 301 can be allowed to selectively operate in at least three operation modes to be described below by appropriately controlling the above-described respective switches. It is preferable that selection of the operation modes is configured to appropriately set a control sequence of the above-described respective switches by providing the control register (CREG) 320 to the sequence control circuit (SQENC) 308. The control register (CREG) 320 may be configured as a nonvolatile memory element, or may be configured as a volatile memory element to be initialized or appropriately changed by the sub-processor (SMPU) 5 and the like.

In a first operation mode, the first switched capacitor circuit 11 is allowed to operate as an FIR filter, the second switched capacitor circuit 12 is allowed to operate as an IIR filter, and results of the operations are output after being integrated (accumulatively added) in the integration circuit 13. In a second operation mode, the first switched capacitor circuit 11 is allowed to operate as a QV conversion circuit, the second switched capacitor circuit 12 is allowed to operate as the IIR filter, and results of the operations are output after being integrated (accumulatively added) in the integration circuit 13. In a third operation mode, the first switched capacitor circuit 11 is allowed to operate as an integration circuit, and operations of the second switched capacitor circuit 12 and the integration circuit 13 are stopped, and thus the output VOUT1 of the first switched capacitor circuit 11 is output as an output of the detection circuit 301.

According to this, it is possible to programmably set a configuration capable of allowing the detection circuit 301 to perform the most appropriate operation among the above-described configurations thereof or other configurations in accordance with an environment in which the touch panel control circuit 3 is mounted and used, and thus it is possible to cope with various noise environments. Here, the above-described other configurations represent, for example, a case where the second switched capacitor circuit 12 is allowed to operate as the FIR filter other than the IIR filter, and the like. When the switches CF1 and CF2 are closed, at all times, the integration capacitors Cs2$a$ and Cs2$b$ are connected in parallel with each other, and thus the second switched capacitor circuit 12 can be allowed to operate as the FIR filter.

The respective operation modes will be described in more detail.

First Operation Mode (FIR+IIR+Integration Circuit)

In the first operation mode, the first switched capacitor circuit 11 is allowed to operate as the FIR filter, the second switched capacitor circuit 12 is allowed to operate as the IIR filter, and results of the operations are output after being integrated (accumulatively added) in the integration circuit 13.

FIG. 13 is a timing chart illustrating an operation example of the above-described first operation mode (FIR+IIR+integration circuit). Time is shown on the horizontal axis with an arbitrary unit (a.u.), and signals (TX1 and TX2) for application of pulses to the Y sensor electrodes and signals for on/off control of the above-described respective switches are shown in the vertical axis direction from an upper side thereof. As described above with reference to FIG. 9, a plurality of pulses are intermittently applied to the Y sensor electrodes. FIG. 13 illustrates parts of the plurality of pulses. Four pulses are applied to the sensor electrode Y1 from time t=0.5, and the application is stopped in a display period (not shown) of time t=4 to 15.5. Four pulses are applied to the sensor electrode Y2 from time t=16.5, and the application is stopped in a display period (not shown) after time t=20. As described with reference to FIG. 9, with regard to one Y sensor electrode, a period in which one or a plurality of pulses are applied and a period in which application of the pulses are stopped for display are repetitively shown. However, only four pulse application periods and four pulse stopping periods (display periods) are shown in FIG. 13. When a pulse is applied to the Y sensor electrode, an electric charge corresponding to the intersection capacitor Cxy is input from the X sensor electrode to the input terminal PX1 of the detection circuit 10_1.

The switch S2 of the first switched capacitor circuit 11 is closed in synchronization with the pulse that is applied to the Y sensor electrode, and the electric charge that is input is transmitted to the integration capacitor Cs1. Whenever the electric charge is transmitted, the electric charge is accumulated in the integration capacitor Cs1, and is output to the VOUT1. The switch S1 discharges the electric charges accumulated in the integration capacitor Cs1 in a periodic manner similar to time t=0 to 0.5, and t=5 to 5.5. The output VOUT1 is retained in the sample-and-hold capacitor Csh1 through the switch S41. As described above, the first switched capacitor circuit 11 operates as a quartic FIR filter, integrates the electric charges which are periodically input to the terminal PX1 in synchronization with the pulse applied to the Y sensor electrode and which correspond to four pulse periods, and outputs the integrated electric charges to the sample-and-hold capacitor Csh1 for every four pulse periods. The operations of the switches S1, S2, S3, and S41 repetitively continue at the same cycle as described above even in the period t=4 to 16 in which application of the pulses to the sensor electrode Y1 is stopped.

The output of the first switched capacitor circuit 11, which is retained in the sample-and-hold capacitor Csh1, is input to the second switched capacitor circuit 12 by the switch S42 for every four pulse periods. At time t=4 to 4.5, all of the switches CF1 and CF2 are closed, and the integration capacitors Cs2$a$ and Cs2$b$ are connected in parallel with each other, and thus the capacitance value becomes a value of Cs2$a$+Cs2$b$. The output of the FIR filter, which is input to the second switched capacitor circuit 12, is accumulated in the integration capacitors Cs2$a$ and Cs2$b$. At time t=4.5 to 8, the switches CF1 and CF2 are opened in combination with each other, and the switches S12 and S13 are closed. Accordingly, the integration capacitor Cs2$b$ is short-circuited and discharged, and is initialized with a voltage VHSP. Next, at time t=8 to 8.5, all of the switches CF1 and CF2 are closed again, and the subsequent output of the FIR filter, which is input to the second switched capacitor circuit 12, is accumulated in the integration capacitors Cs2$a$ and Cs2$b$. As described above, the second switched capacitor circuit 12 operates as the IIR filter in which electric charges that are retained up to an immediately previous sampling, a part of the electric charge that is retained in the second switched capacitor circuit 12 (i.e., Cs2$b$/(Cs2$a$+Cs2$b$)) is discarded, and newly input sampling data is accumulated in the integration capacitors Cs2a+Cs2b. It is possible to adjust frequency characteristics by a ratio Cs2b/(Cs2a+Cs2b) which determines a feedback coefficient of the IIR filter. When the capacitance values of the integration capacitors Cs2a and Cs2b are configured to be changed, for example, by register setting, adjustment of the frequency characteristics is possible. Similarly, the operations of the switches S42, CF1, CF2, 12, and 13 also repetitively continue at the same cycle as described above even in the period t=4 to 16 in which application of the pulses to the sensor electrode Y1 is stopped.

An output of the second switched capacitor circuit 12 that operates as the IIR filter is transmitted to the sample-and-hold capacitor Csh2 by closing the switch S43, and is input to the integration circuit 13 by closing the switch S44. In the integration circuit 13, outputs of the IIR filter, which are input four times at time t=4.5, t=8.5, t=12.5, and t=16.5, are output after being accumulatively added in the integration capacitor Cs3. The output VOUT3 of the integration circuit 13 is transmitted to the sample-and-hold capacitor CSH of the sample-and-hold circuit 14 by closing the switch S4 (time t=17). On the other hand, electric charges accumulated in the integration capacitor Cs3 are discharged by closing the switch S14 (time t=18), and thus the integration circuit 13 is reset. Similarly, the operations of the switches S43, S44, S14, and S4 repetitively continue at the same cycle as described above, even in the period t=4 to 16 in which application of the pulses to the sensor electrode Y1 is stopped.

When being selected by the switch S6_RX1 of the selector 303 (time t=18), an output retained in the sample-and-hold capacitor CSH is input to the AD conversion circuit 304 through the voltage follower amplifier using the operational amplifier AMP4.

Subsequently, although not shown, the detection circuit 301 repeats the above-described operations with respect to pulses (TX2 to TXM) that are applied to sensor electrodes Y2 to YM by other operational amplifiers 30_2 to 30_M.

Hereinbefore, description has been given to an example in which when 16 pulses are input to the terminal PX1, the first switched capacitor circuit 11 is allowed to operate as a quartic FIR filter that operates for every four pulses, and the second switched capacitor circuit 12 is allowed to operate as a quartic IIR filter that operates for every four pulses, but the order of the FIR filter and the IIR filter can be changed in an arbitrary manner. In addition, it is suitable that the number of times of operation of the integration circuit 13, that is, the number of times of piling-up, is configured to be changed, for example, by register setting.

A signal charge transmission timing, which is shown in FIG. 13, between the first switched capacitor circuit 11 that operates as an FIR filter, the second switched capacitor circuit 12 that operates as an IIR filter, and the integration circuit 13 is illustrative only, and can be changed in an arbitrary manner. For example, description has been given of an example in which the input to the second switched capacitor circuit 12 and the output therefrom are performed at the same timing, but the timing can be adjusted to increase the time interval from the input to the IIR filter to the output from the IIR filter by retarding the timing of closing the switch S43 in comparison to a timing of closing the switch S42 by several cycles, and the like. In addition, the second switched capacitor circuit 12 is also allowed to operate as an FIR filter by closing the switches CF1 and CF2 at all times.

As described above, in the first operation mode, the first and second switched capacitor circuits 11 and 12 are allowed to operate as an FIR filter and an IIR filter, respectively, and the results thereof are output after being integrated (accumulatively added) in the integration circuit 13. The first and second switched capacitor circuits 11 and 12 that operate as the FIR filter and the IIR filter, the integration circuit 13 that operates in synchronization with a pulse applied to the Y sensor electrodes, the sampling operation with respect to the X sensor electrodes, and the subsequent filtering operation and integration operation may continue at the same cycle even in a period in which application of a pulse to the Y sensor electrodes is stopped. According to such an embodiment, even in a case where application of a pulse to the Y sensor electrodes is intermittently stopped for every one line cycle for display drive and touch detection, a pass characteristic peak does not appear at a frequency of the reciprocal of the one line cycle. Thus, it is possible to further increase the noise suppressing effect due to intrinsic pass characteristics of the FIR filter and the IIR filter.

Second Operation Mode (QV Converter+IIR+Integration Circuit)>

In the second operation mode, the first switched capacitor circuit 11 is allowed to operate as a QV conversion circuit, the second switched capacitor circuit 12 is allowed to operate as an IIR filter, and the results thereof are output after being integrated (accumulatively added) in the integration circuit 13.

FIG. 14 is a timing chart illustrating an operation example of the above-described second operation mode (QV conversion+IIR+integration Circuit). As is the case with FIG. 13, time is shown on the horizontal axis with an arbitrary unit, and signals (TX1 and TX2) for application of pulses to the Y sensor electrodes and signals for on/off control of the above-described respective switches are shown in the vertical axis direction from an upper side thereof. As is the case with the first operation mode described with reference to FIG. 13, a plurality of pulses are intermittently applied to the Y sensor electrodes. Four pulses are applied to the sensor electrode Y1 from time t=0.5, and the application is stopped in a display period (not shown) at time t=4 to 15.5.

The switch S2 of the first switched capacitor circuit 11 is closed in synchronization with the pulse that is applied to the Y sensor electrode, and the electric charge that is input is transmitted to the integration capacitor Cs1. Whenever the electric charge is transmitted, the electric charge is accumulated in the integration capacitor Cs1, and is output to the VOUT1. The switch S1 periodically discharges the electric charges accumulated in the integration capacitor Cs1 at a phase opposite to that of the switch S2. The output VOUT1 is retained in the sample-and-hold capacitor Csh1 through the switch S41. Differently from the operation as the FIR filter which is described with reference to FIG. 13, a signal charge corresponding to one pulse that is input to the Y sensor electrode is output to VOUT1 as is without being accumulated, and is transmitted to the sample-and-hold capacitor Csh1 and is retained therein. The first switched capacitor circuit 11 operates as a QV conversion circuit that converts an electric charge Q, which is input, to a voltage V. The first switched capacitor circuit 11 periodically converts an electric charge input to the terminal PX1 to a voltage VOUT in synchronization with a pulse that is applied to the Y sensor electrode, and outputs the converted voltage to the sample-and-hold capacitor Csh1 for every one pulse. The operations of the switches S1, S2, S3, and S41 repetitively continue at the same cycle as described above even in the period t=4 to 16 in which application of a pulse to the sensor electrode Y1 is stopped.

An output of the first switched capacitor circuit 11, which is retained in the sample-and-hold capacitor Csh1, is input to the second switched capacitor circuit 12 by the switch S42 for every one pulse. A signal charge that is input to the second switched capacitor circuit 12 is accumulated for every four inputs in the integration capacitors Cs2a and Cs2b which are connected in parallel with each other because the switches CF1 and CF2 are closed, and Cs2b/(Cs2a+Cs2b) is discarded at time t=4.5 to 5, t=8.5 to 9, t=12.5 to 13, . . . . . As described above, the second switched capacitor circuit 12 operates as the IIR filter. Similarly, the operations of the switches S42, CF1, CF2, S12, and S13 repetitively continue at the same cycle as described above even in the period t=4 to 16 in which application of a pulse to the sensor electrode Y1 is stopped.

An output of the second switched capacitor circuit 12 that operates as the IIR filter is transmitted to the sample-and-hold capacitor Csh2 by closing the switch S43, and is input to the integration circuit 13 by closing the switch S44. In the integration circuit 13, outputs of the IIR filter, which are input four times at time t=4.5, t=8.5, t=12.5, and t=16.5, are accumulated in the integration capacitor Cs3 and are output. The output VOUT3 of the integration circuit 13 is transmitted to the sample-and-hold capacitor CSH of the sample-and-hold circuit 14 by closing the switch S4 (time t=17). On the other hand, electric charges accumulated in the integration capacitor Cs3 of the integration circuit 13 are discharged by closing the switch S14 (time t=18 to 21), and thus the integration circuit 13 is reset.

When being selected by the switch S6_RX1 of the selector 303 (time t=18), an output retained in the sample-and-hold capacitor CSH is input to the AD conversion circuit 304 through the voltage follower amplifier using the operational amplifier AMP4.

Subsequently, although not shown, the detection circuit 301 repeats the above-described operations with respect to pulses (TX2 to TXM) that are applied to sensor electrodes Y2 to YM by other operational amplifiers 30_2 to 30_M.

Hereinbefore, description has been given of an example in which when four pulses are input to the terminal PX1, the first switched capacitor circuit 11 is allowed to operate as a QV conversion circuit that operates for every one pulse, and the second switched capacitor circuit 12 is allowed to operate as an IIR filter that operates for every four pulses. However, the order of the IIR filter can be changed in an arbitrary manner.

As described above, in the second operation mode, the first and second switched capacitor circuits 11 and 12 are allowed to operate as a QV conversion circuit and an IIR filter, respectively, and the results thereof are output after being integrated (accumulatively added) in the integration circuit 13. The first and second switched capacitor circuits 11 and 12 which operate as the QV conversion circuit and the IIR filter, and the integration circuit 13 operate in synchronization with a pulse applied to the Y sensor electrodes, and the sampling operation with respect to the X sensor electrodes, and the subsequent filtering operation and integration operation continue at the same cycle even in a period in which application of a pulse to the Y sensor electrodes is stopped. According to this embodiment, even in a case where application of a pulse to the Y sensor electrodes is intermittently stopped for every one line cycle for display drive and touch detection, a pass characteristic peak does not appear at a frequency of the reciprocal of the one line cycle. Thus, it is possible to further increase the noise suppressing effect due to intrinsic pass characteristics of the QV conversion circuit and the IIR filter.

Third Operation Mode (Only Integrator)

In a third operation mode, the first switched capacitor circuit 11 is allowed to operate as an integration circuit, and operations of the second switched capacitor circuit 12 and the integration circuit 13 are stopped, and thus the output VOUT1 of the first switched capacitor circuit 11 is output as an output of the detection circuit 301.

FIG. 15 is a timing chart illustrating an operation example of the above-described third operation mode (only an integration circuit). As is the case with FIGS. 13 and 14, time is shown on the horizontal axis with an arbitrary unit, and signals (TX1 and TX2) for the application of pulses to the Y sensor electrodes and signals for on/off control of the above-described respective switches are shown in the vertical axis direction from an upper side thereof. As is the case with the first operation mode described with reference to FIG. 13, a plurality of pulses are intermittently applied to the Y sensor electrodes. Four pulses are applied to the sensor electrode Y1 from time t=0.5, and the application is stopped in a display period (not shown) of time t=4 to 15.5.

The switch S2 of the first switched capacitor circuit 11 is closed in synchronization with the pulse that is applied to the Y sensor electrode, and the electric charge that is input is transmitted to the integration capacitor Cs1. Whenever the electric charge is transmitted, the electric charge is accumulatively added in the integration capacitor Cs1, and is output to the VOUT1. The switch S2 repetitively continues at the same cycle even in a period t=4 to 16 in which application of a pulse to the sensor electrode Y1 is stopped. The switch S1 discharges the electric charges accumulated in the integration capacitor Cs1 in a periodic manner similar to that in time t=0 to 0.5 and t=16 to 16.5. The output VOUT1 is retained in the sample-and-hold capacitor CSH through the switch SITG and the switch S4. The operations of the second switched capacitor circuit 12 and the integration circuit 13 are stopped, and particularly, an output of the operational amplifier AMPS of the integration circuit 13 is controlled to a high impedance.

As described above, in the third operation mode, the first switched capacitor circuit 11 is allowed to operate as an integration circuit, and is directly connected to the sample-and-hold circuit 14 by by-passing the second switched capacitor circuit 12 and the integration circuit 13. A configuration, in which only the integration circuit 13 is allowed to operate in a state in which the first switched capacitor circuit 11 and the second switched capacitor circuit 12 are by-passed, may be employed. The first switched capacitor circuit 11, which operates as an integration circuit, operates in synchronization with a pulse that is applied to the Y sensor electrodes, and the sampling operation with respect to the X sensor electrodes and the integration operation continue at the same cycle even in a period in which application of a pulse to the Y sensor electrodes is stopped. According to this, even in a case where application of a pulse to the Y sensor electrodes is intermittently stopped for every one line cycle for display drive and touch detection, a pass characteristic peak does not appear at a frequency of the reciprocal of the one line cycle. Thus, it is possible to further increase the noise suppressing effect due to intrinsic pass characteristics of the integration circuit.

[Third Embodiment] Programmable SCF (Dual Edge Detection Type)

In the second embodiment, during rising of the pulse TX1 that is applied to the sensor electrode Y1, an electric charge corresponding to the intersection capacitor Cxy is input from the detection electrode X1, and a variation amount of the intersection capacitor between touching and non-touching is detected on the basis of the signal charge. In contrast, in the third embodiment, electric charge migration, which occurs at a rising edge and a falling edge of the pulse TX1 that is applied to the sensor electrode Y1, is detected to detect an amount of variation of the intersection capacitor between touching and non-touching.

FIG. 16 is a circuit diagram illustrating a configuration example of a detection circuit (dual edge detection type) according to the third embodiment. As is the case in FIG. 12, FIG. 16 illustrates an example of a circuit configuration in which the detection circuit 301, the sample-and-hold circuit 302, and the selector 303 are connected to one detection electrode (X sensor electrode). An input of a first switched capacitor circuit 11 is connected to the detection electrode (X sensor electrode) X1 through the terminal PX1, and an output is transmitted to a second switched capacitor circuit 12 through a switch S41 and a sample-and-hold capacitor Csh1. An output of the second switched capacitor circuit 12 is transmitted to an integration circuit 13 through a switch S43 and a sample-and-hold capacitor Csh2. An output of the integration circuit 13 is connected to one sample-and-hold circuit 14, which constitutes the sample-and-hold circuit 302, through the switch S4. An output of the sample-and-hold circuit 14 is connected to the AD conversion circuit 304 through one switch S6_RX1 that constitutes the selector 303. An output of the first switched capacitor circuit 11 is connected to a switch S4, which is an input of the sample-and-hold circuit 14, through a switch SITG. The above-described respective switches, and respective switches, which are described later, in the first and second switched capacitor circuits 11 and 12 and the integration circuit 13 are controlled by the control signals Csig2 to Csig4 that are output from the sequence control circuit 308.

The first switched capacitor circuit 11 includes an operational amplifier AMP1 in which a positive side input (+) is fixed to a predetermined potential (VHSP). The integration capacitor Cs1 and the switch S1 are connected in parallel with each other between a negative side input (−) and an output VOUT1 of the operational amplifier AMP1. Switches CFA1, CFA2, CFB1, and CFB2 are connected to both ends of the integration capacitor Cs1, and have a configuration in which a connection relationship of the integration capacitor Cs1 with respect to the operational amplifier AMP1 can be inverted. That is, the connection relationship of the integration capacitor Cs1 with respect to the operational amplifier AMP1 can be inverted between a state in which the switches CFA1 and CFA2 are closed and the switches CFB1 and CFB2 are opened, and a state in which the switches CFA1 and CFA2 are opened and the switches CFB1 and CFB2 are closed. The other configurations are the same as those of the first switched capacitor circuit 11 shown in FIG. 12. A switch S2 is connected to between the input terminal PX1 and the negative side input (−) of the operational amplifier AMP1, and the input terminal PX1 may be fixed to a predetermined potential VHSP by a switch S3.

As described later, the first switched capacitor circuit 11 can be allowed to operate as an FIR filter, a QV converter, or an integration circuit by appropriately controlling the timing of the switches S1 to S3, the switches CFA1, CFA2, CFB1, and CFB2, and the switch S41 that controls transmission to a sample-and-hold capacitor Csh1 of a subsequent stage.

The second switched capacitor circuit 12 and the integration circuit 13 are configured similarly to FIG. 12, and description thereof will not be repeated.

The detection circuit 301 can be allowed to selectively operate in a total of six operation modes further including three operation modes in addition to the three operation modes disclosed in the second embodiment. As is the case with description in the second embodiment, it is suitable that selection of the operation modes is configured to appropriately set a control sequence of the above-described respective switches by providing the control register (CREG) 320 for the sequence control circuit (SQENC) 308.

In the first to third operation modes, the first switched capacitor circuit 11 is allowed to operate as an FIR filter, a QV conversion circuit, or an integration circuit of the single edge detection type as illustrated in the second embodiment. For operation of the single edge detection type circuit, for example, a state, in which the switches CFA1 and CFA2 are closed and the switches CFB1 and CFB2 are opened, is fixed, and then operation may be allowed in the same operation modes illustrated in the second embodiment.

In correspondence with such embodiments, in the fourth to sixth operation modes, the first switched capacitor circuit 11 is allowed to operate as an FIR filter, a QV conversion circuit, or an integration circuit of a dual edge detection type. A period, for which the switch S2 is closed, is provided at a rising edge and a falling edge of the pulse TX1 that is applied to the sensor electrode Y1, and the connection relationship of the integration capacitor Cs1 with respect to the operational amplifier AMP1 is inverted between a rising period and a falling period. During the rise and fall of the pulse TX1, a migration direction of a signal charge that is generated is inverted. Accordingly, when the polarity of an integration capacitor is inverted in accordance with the inversion of the migration direction, it is possible to detect a signal charge at both the rising edge and the falling edge of the pulse TX1. In the fourth to sixth operation modes, the amount of signal charges that is detected can be doubled, and thus it is possible to improve touch detection sensitivity.

The fourth to sixth operation modes of the dual edge detection type circuit will be described in more detail.

Fourth Operation Mode (Dual Edge Detection Type FIR+IIR+Integration Circuit):

In the fourth operation mode, as is the case with the first operation mode, the first switched capacitor circuit 11 is allowed to operate as an FIR filter, the second switched capacitor circuit 12 is allowed to operate as an IIR filter, and the results thereof are output after being integrated (accumulatively added) in the integration circuit 13. However, the first switched capacitor circuit 11 of a first stage is allowed to operate as an FIR filter of a dual edge detection type.

Figure 17:
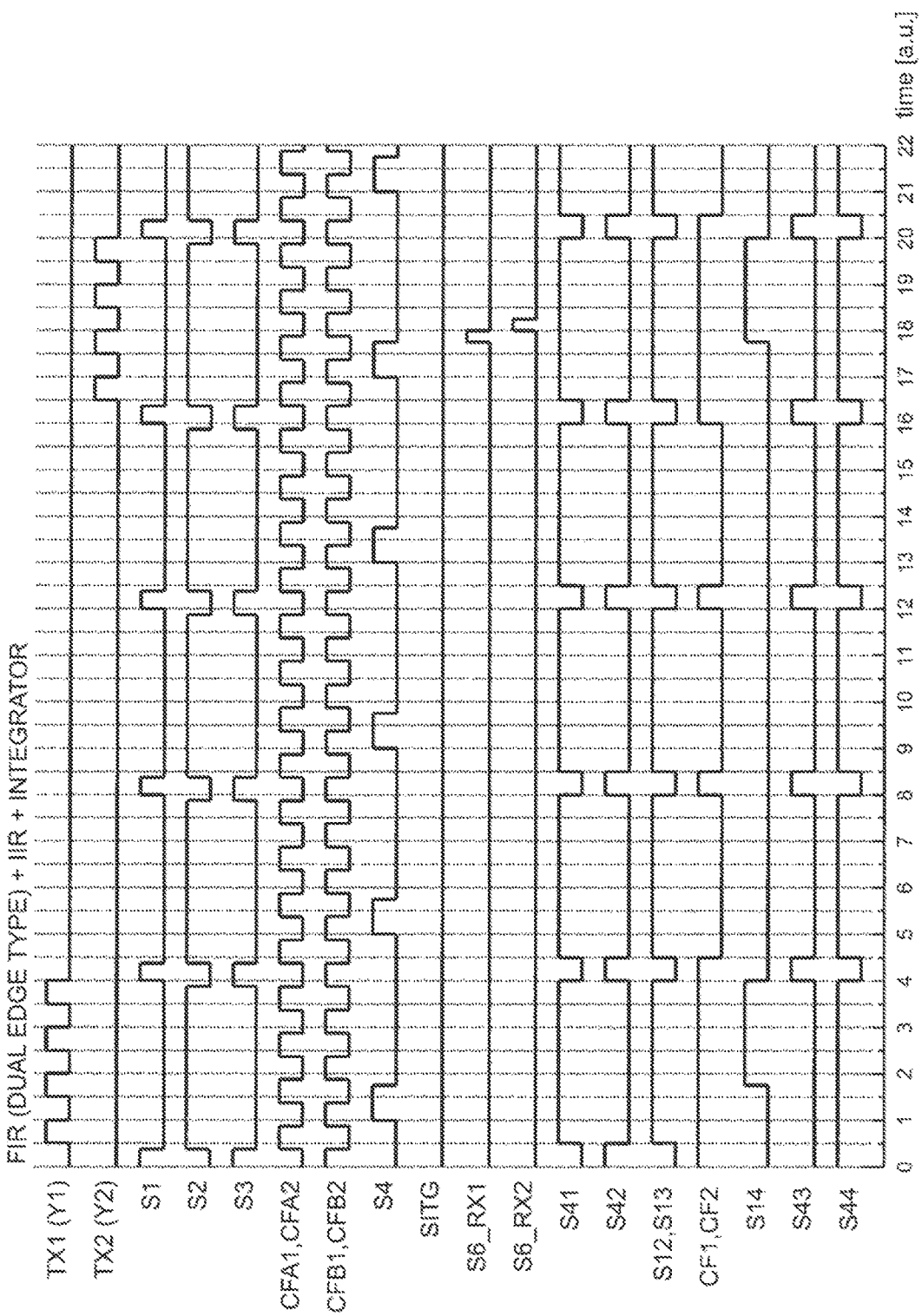
FIG. 17 is a timing chart illustrating a fourth operation mode (dual edge detection type FIR+IIR+integration circuit) of the detection circuit according to the third embodiment.

FIG. 17 is a timing chart illustrating an operation example of the fourth operation mode (dual edge detection type FIR+IIR+integration circuit). Time is shown on the horizontal axis with an arbitrary unit (a.u.), and signals (TX1 and TX2) for application of pulses to the Y sensor electrodes and signals for on/off control of respective switches including the above-described switches CFA1, CFA2, CFB1, and CFB2 are shown in the vertical axis direction from an upper side thereof. As is the case with the respective operation modes in the second embodiment described with reference to FIGS. 13 to 15, a plurality of pulses are intermittently applied to the Y sensor electrodes. That is, four pulses are applied to the sensor electrode Y1 from time t=0.5, and the application is stopped at a display period (not shown) of time t=4 to 15.5. When a pulse is applied to the Y sensor electrode, an electric charge corresponding to the intersection capacitor Cxy is input from the X sensor electrode to the input terminal PX1 of the detection circuit 10_1. Here, the dual edge detection type circuit uses a configuration in which migration of the electric charge occurs at each of a rising edge and a falling edge of the pulse that is applied to the Y sensor electrode, and migration directions thereof are opposite to each other.

Before the rising edge of the pulse is applied to the Y sensor electrode (at time t=0.5−α), the switch S2 of the first switched capacitor circuit 11 is closed, the switches CFA1 and CFA2 are closed, and the switches CFB1 and CFB2 are opened. At time t=0.5, a signal charge, which occurs in accordance with the rising of the pulse that is applied to the Y sensor electrode and which is input from X sensor electrode, is transmitted to the integration capacitor Cs1. Next, before the falling edge of the pulse is applied to the Y sensor electrode (at time t=1.0−α), the switches CFA1 and CFA2 are opened, and the switches CFB1 and CFB2 are closed, and thus a connection relationship of the integration capacitor Cs1 with respect to the operational amplifier AMP1 is inverted. It can be said that the polarity of the integration capacitor Cs1 is inverted. At time t=1.0, a signal charge, which occurs in accordance with the falling of the pulse that is applied to the Y sensor electrode, and which is input from the X sensor electrode, is transmitted to the integration capacitor Cs1 that is inverted. Subsequently, control of closing the switches CFA1 and CFA2 and opening the switches CFB1 and CFB2 in synchronization with a rising edge (time t=1.5, 2.5, 3.5) of a pulse that is applied to the Y sensor electrode (before the edge), and control of opening the switches CFA1 and CFA2 and closing the switches CFB1 and CFB2 in synchronization with a falling edge (time t=2, 3, 4) (before the edge) of the pulse are repeated in the same manner. A migration direction of a signal charge, which occurs in accordance with the rise and fall of the pulse applied to the Y sensor electrode and which is input from the X sensor electrode, is inverted between the rise and fall thereof. A signal charge that is input from the X sensor electrode is detected at both edges of the pulse, and is accumulatively added to the integration capacitor Cs1 as an absolute value. The switch S41 is closed for a period of time t=0.5 to 4, and the output VOUT1 is transmitted to the sample-and-hold capacitor Csh1. An output of the first switched capacitor circuit 11, which is retained in the sample-and-hold capacitor Csh1, is input to the second switched capacitor circuit 12 at time t=4 by the switch S42. Electric charges that are accumulated in the integration capacitor Cs1 are transmitted to the sample-and-hold capacitor Csh1, and then are discharged and initialized by the switch S1. Subsequently, the first switched capacitor circuit 11 operates as an FIR filter that integrates electric charges input to the terminal PX1, which correspond to four pulse periods at the same cycle even in a period t=4 to 16 in which application of a pulse to the sensor electrode Y1 is stopped, and outputs the integrated electric charges to the sample-and-hold capacitor Csh1 for every four pulse periods.

Operations of the second switched capacitor circuit 12 and the integration circuit 13 of subsequent stages are the same as the first operation mode (single edge detection type FIR+IIR+integration circuit) described with reference to FIG. 13 in the second embodiment, and thus description thereof will not be repeated.

As described above, in the fourth operation mode (dual edge detection type FIR+IIR+integration circuit), the first and second switched capacitor circuits 11 and 12 are allowed to operate as an FIR filter and an IIR filter, respectively, and results thereof are output after being integrated (accumulatively added) in the integration circuit 13. An amount of signal charges that are input to the FIR filter of the first stage can be doubled in comparison to the first operation mode, and thus it is possible to improve touch detection sensitivity. In addition, even in a period in which application of a pulse to the Y sensor electrodes is stopped, the sampling operation with respect to the X sensor electrodes and the subsequent filtering operation and integration operation continue at the same cycle. According to this embodiment, even in a case where application of a pulse to the Y sensor electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the FIR filter and the IIR filter.

Fifth Operation Mode (Dual Edge Detection Type QV Conversion+IIR+Integration Circuit)

In the fifth operation mode, as is the case with the second operation mode, the first switched capacitor circuit 11 is allowed to operate as a QV conversion circuit, the second switched capacitor circuit 12 is allowed to operate as an IIR filter, and the results thereof are output after being integrated (accumulatively added) in the integration circuit 13. However, the first switched capacitor circuit 11 of the first stage is allowed to operate as a QV conversion circuit of a dual edge detection type.

FIG. 18 is a timing chart illustrating an operation example of the fifth operation mode (dual edge detection type QV conversion+IIR+integration circuit). As is the case with FIG. 17, time is shown on the horizontal axis with an arbitrary unit (a.u.), and signals (TX1 and TX2) for application of pulses to the Y sensor electrodes and signals for on/off control of respective switches including the above-described switches CFA1, CFA2, CFB1, and CFB2 are shown in the vertical axis direction from an upper side thereof. As is the case with the fourth operation mode described with reference to FIG. 17, a plurality of pulses are intermittently applied to the Y sensor electrodes. That is, four pulses are applied to the sensor electrode Y1 from time t=0.5, and the application is stopped in a display period (not shown) of time t=4 to 15.5. When a pulse is applied to the Y sensor electrode, an electric charge corresponding to the intersection capacitor Cxy is input from the X sensor electrode to the input terminal PX1 of the detection circuit 10_1. Here, since the fifth operation mode also uses a dual edge detection type circuit, the fifth operation mode uses a configuration in which migration of the electric charge occurs at each of a rising edge and a falling edge of the pulse that is applied to the Y sensor electrode, and migration directions thereof are opposite to each other.

Before the rising edge (time t=0.5) of the pulse is applied to the Y sensor electrode, the switch S2 of the first switched capacitor circuit 11 is closed, the switches CFA1 and CFA2 are closed, and the switches CFB1 and CFB2 are opened. At time t=0.5, a signal charge, which occurs in accordance with the rising of the pulse that is applied to the Y sensor electrode and which is input from the X sensor electrode, is transmitted to the integration capacitor Cs1. Next, before the falling edge (time t=1.0) of the pulse is applied to the Y sensor electrode, the switches CFA1 and CFA2 are opened, and the switches CFB1 and CFB2 are closed, and thus a connection relationship of the integration capacitor Cs1 with respect to the operational amplifier AMP1 is inverted (a polarity of an integration capacitor Cs1 is inverted). At time t=1.0, a signal charge, which occurs in accordance with the falling of the pulse that is applied to the Y sensor electrode, and which is input from the X sensor electrode, is transmitted to the integration capacitor Cs1 that is inverted, is accumulatively added to the electric charge that is transmitted at the rising edge, and the added electric charges are output to VOUT1. The switch S1 periodically discharges the electric charges accumulated in the integration capacitor Cs1 at a phase opposite to that of the switch S2. The output VOUT1 is retained in the sample-and-hold capacitor Csh1 through the switch S41. Differently from the operation as the FIR filter described with reference to FIG. 17, a signal charge, which is input to the Y sensor electrodes and corresponds to one pulse, is not accumulated over a plurality of sampling periods, and a signal charge that is sampled twice in synchronization with a rising timing and a falling timing of one sampling period is added having polarities opposite to each other, and is output to VOUT1. As described above, the first switched capacitor circuit 11 operates as a QV conversion circuit that converts an electric charge Q, which is input, to a voltage V. The first switched capacitor circuit 11 periodically converts an electric charge input to the terminal PX1 to a voltage VOUT in synchronization with a pulse that is applied to the Y sensor electrode, and outputs the converted voltage to the sample-and-hold capacitor Csh1 for every one pulse. The operations of the switches S1, S2, S3, and S41 repetitively continue at the same cycle even in a period t=4 to 16 in which application of a pulse to the Y sensor electrode is stopped.

Operations of the second switched capacitor circuit 12 and the integration circuit 13 of subsequent stages are the same as the second operation mode (single edge detection type QV conversion+IIR+integration circuit) described with reference to FIG. 14 in the second embodiment, and thus description thereof will not be repeated.

As described above, in the fifth operation mode (dual edge detection type QV conversion+IIR+integration circuit), the first and the second switched capacitor circuits 11 and 12 are allowed to operate as a QV conversion circuit and an IIR filter, respectively, and results thereof are output after being integrated (accumulatively added) in the integration circuit 13. An amount of signal charges that are input to the FIR filter of the first stage can be doubled in comparison to the second operation mode, and thus improve touch detection sensitivity. In addition, even in a period in which application of a pulse to the Y sensor electrodes is stopped, the sampling operation with respect to the X sensor electrodes and the subsequent filtering operation and integration operation continue at the same cycle. According to this embodiment, even in a case where application of a pulse to the Y sensor electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the QV conversion circuit and the IIR filter.

Sixth Operation Mode (Only Dual Edge Detection Type Integrator)

In the sixth operation mode, as is the case with the third operation mode, the first switched capacitor circuit 11 is allowed to operate as an integration circuit, and operations of the second switched capacitor circuit 12 and the integration circuit 13 are stopped, and thus the output VOUT1 of the first switched capacitor circuit 11 is output as an output of the detection circuit 301. However, the first switched capacitor circuit 11 is allowed to operate as a dual edge detection type integration circuit.

FIG. 19 is a timing chart illustrating an operation example of a sixth operation mode (only dual edge detection type integrator). As is the case with FIGS. 17 and 18, time is shown on the horizontal axis with an arbitrary unit (a.u.), and signals (TX1 and TX2) for application of pulses to the Y sensor electrodes and signals for on/off control of respective switches including the above-described switches CFA1, CFA2, CFB1, and CFB2 are shown in the vertical axis direction from an upper side thereof. As is the case with the fourth and fifth operation modes described with reference to FIGS. 17 and 18, a plurality of pulses are intermittently applied to the Y sensor electrodes. That is, four pulses are applied to the sensor electrode Y1 from time t=0.5, and the application is stopped in a display period (not shown) of time t=4 to 15.5. When a pulse is applied to the Y sensor electrode, an electric charge corresponding to the intersection capacitor Cxy is input from the X sensor electrode to the input terminal PX1 of the detection circuit 10_1. Here, since the sixth operation mode is also a dual edge detection type, the sixth operation mode also uses a configuration in which migration of the electric charge occurs at each of a rising edge and a falling edge of the pulse that is applied to the Y sensor electrode, and migration directions thereof are opposite to each other.

Before the rising edge of the pulse that is applied to the Y sensor electrode (at time t=0.5−α), the switch S2 of the first switched capacitor circuit 11 is closed, the switches CFA1 and CFA2 are closed, and the switches CFB1 and CFB2 are opened. At time t=0.5, a signal charge, which occurs in accordance with the rise of the pulse that is applied to the Y sensor electrode and which is input from the X sensor electrode, is transmitted to the integration capacitor Cs1. Next, before the falling edge of the pulse that is applied to the Y sensor electrode (at time t=1.0−α), the switches CFA1 and CFA2 are opened, and the switches CFB1 and CFB2 are closed, and thus a connection relationship of the integration capacitor Cs1 with respect to the operational amplifier AMP1 is inverted (a polarity of an integration capacitor Cs1 is inverted). At time t=1.0, a signal charge, which occurs in accordance with the falling of the pulse that is applied to the Y sensor electrode, and which is input from the X sensor electrode, is transmitted to the integration capacitor Cs1 that is inverted, and is accumulatively added to the electric charge that is transmitted at the rising edge. Subsequently, control of closing the switches CFA1 and CFA2 and opening the switches CFB1 and CFB2 in synchronization with a rising edge (time t=1.5, 2.5, 3.5, 4.5) of a pulse that is applied to the Y sensor electrode (before the edge), and control of opening the switches CFA1 and CFA2 and closing the switches CFB1 and CFB2 in synchronization with a falling edge (time t=2, 3, 4, 5) (before the edge) of the pulse are repeated in the same manner. A migration direction of a signal charge, which occurs in accordance with the rising and falling of the pulse applied to the Y sensor electrode and which is input from the X sensor electrode, is inverted between the rising and falling thereof. A signal charge that is input from the X sensor electrode is detected at both edges of the pulse, is accumulatively added to the integration capacitor Cs1 as an absolute value, and is output to VOUT1. The operations of the switch S2, the switches CFA1 and CFA2, and the switches CFB1 and CFB2 repetitively continue at the same cycle as described above even in the period of t=4 to 16 in which application of a pulse to the Y sensor electrodes is stopped. The switch S1 periodically discharges electric charges that are accumulated in the integration capacitor Cs1 at a phase opposite that of the switch S2. The output VOUT1 is retained in the sample-and-hold capacitor CSH by the switch SITG and the switch S4. Operations of the second switched capacitor circuit 12 and the integration circuit 13 are stopped, and particularly, an output of the operational amplifier AMPS of the integration circuit 13 is controlled to a high impedance.

As described above, in the sixth operation mode (only dual edge detection type integrator), as is the case with the third operation mode, the first switched capacitor circuit 11 is allowed to operate an integration circuit, and is directly connected to the sample-and-hold circuit 14 by by-passing the second switched capacitor circuit 12 and the integration circuit 13. In the sixth operation mode, an amount of signal charges, which are input to the first switched capacitor circuit 11 that operates as the integration circuit, can be doubled in comparison to the third operation mode, and thus it is possible to improve touch detection sensitivity. In addition, the sampling with respect to the X sensor electrodes and the integration operation continue at the same cycle even in a period in which application of a pulse to the Y sensor electrodes is stopped. Accordingly, even in a case where application of a pulse to the Y sensor electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the integration circuit.

Embodiments of the present disclosure may include the following examples:

Example 1

A touch panel control circuit,
wherein the switched capacitor circuit is configured to control inverting a connection direction of the first integration capacitor,
wherein the sequence control circuit is configured to continuously control a timing of turning on and off the input switch and the first switch of the detection circuit and a timing of discharging a part or the entirety of the second integration capacitor in synchronization with a rising edge and a falling edge of the plurality of pulses that are output to the drive circuit, and in synchronization with timings in accordance with a rising edge and a falling edge when assuming that the pulses continue at a cycle as is in a period in which the pulses are not input,
wherein the sequence control circuit inverts a connection direction of the first integration capacitor at a timing corresponding to a rising edge of the plurality of pulses and a rising edge when assuming that the pulses continue at a cycle as is in a period in which the pulses are not input, and a connection direction of the first integration capacitor at a timing corresponding to a falling edge of the plurality of pulses and a falling edge when assuming that the pulses continue at a cycle as is in a period in which the pulses are not input from each other.

Example 2

A semiconductor integrated circuit, comprising:
a touch panel control circuit disposed on a single semiconductor substrate, wherein the touch panel control circuit is configured to be connected to a touch panel in which an intersection capacitor is formed at each of a plurality of intersections at which a plurality of Y sensor electrodes and a plurality of X sensor electrodes intersect each other, the touch panel control circuit comprising:
a plurality of drive circuits connected to the plurality of Y sensor electrodes, respectively, and configured to apply a plurality of pulses to a corresponding Y sensor electrode for every predetermined period;
a plurality of detection circuits connected to the plurality of X sensor electrodes, respectively, through a plurality of input terminals; and
a sequence control circuit configured to control operation sequences of the plurality of drive circuits and the plurality of detection circuits,
wherein each of the detection circuits includes a switched capacitor circuit, an input terminal connected to a corresponding X sensor electrode, and an input switch configured to perform control of electrically connecting and cutting off the switched capacitor circuit, and
the sequence control circuit is configured to perform control of electrically connecting and cutting off the input switch with respect to the detection circuit in the predetermined period in a continuous and repetitive manner at a predetermined cycle, and is further configured to allow the drive circuit to intermittently apply the plurality of pulses to a corresponding Y sensor electrode in the predetermined period in synchronization with the predetermined cycle.

Example 3

The semiconductor integrated circuit according to example 2, further comprising:
a display drive circuit disposed on the semiconductor substrate, wherein the display drive circuit is connected to a display panel configured to overlap the touch panel and is further configured to drive and control the display panel.

Example 4

The semiconductor integrated circuit according to example 3, further comprising:
a microcontroller disposed on the semiconductor substrate, wherein the microcontroller is configured to control the touch panel control circuit and is further configured to read out data based on the output of the plurality of detection circuits.

Hereinbefore, the invention has been described in detail with reference to the embodiments, but the invention is not limited thereto, and it is needless to say that various modifications can be made in a range not departing from the gist of the invention. For example, the display panel (DP) 2 may be a liquid crystal display panel, an organic EL display panel, and other display panels of arbitrary types. In addition, the liquid crystal display panel may be either an amorphous silicon type liquid crystal display panel or a low-temperature polysilicon type liquid crystal display panel.

What is claimed is:
1. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:
a plurality of drive circuits connected to the plurality of Y sensor electrodes, respectively, and each configured to apply a plurality of pulses to a corresponding one of the Y sensor electrodes; and
a plurality of detection circuits connected to the plurality of X sensor electrodes, respectively,
wherein each of the detection circuits includes a switched capacitor circuit configured to perform sampling of a signal from each of the X sensor electrodes, to which the detection circuits are connected, wherein the touch panel is mounted so as to overlap a display panel, and the touch panel control circuit is configured to perform timing control of providing a display drive period of the display panel and a touch detection period of the touch panel in each line period, wherein the plurality of drive circuits are configured to output the pulses in the touch detection period and to stop output of the pulses in the display drive period, and wherein each of the plurality of detection circuits is configured to allow the switched capacitor circuit to continue the operation of sampling the signal from each of the X sensor electrodes in the display drive period and the touch detection period.

2. The touch panel control circuit according to claim 1, further comprising:

a sequence control circuit configured to control each of the plurality of drive circuits and a respective one of the plurality of detection circuits in synchronization with a same clock signal.

3. The touch panel control circuit according to claim 1, wherein the operation of sampling the signal from the X sensor electrodes by the switched capacitor circuit continues in the predetermined period at a predetermined cycle.

4. The touch panel control circuit according to claim 1, further comprising:

a sequence control circuit configured to control one of the plurality of drive circuits and a respective one of the plurality of detection circuits in synchronization with a same clock signal, wherein the touch detection period is controlled based on at least one of a horizontal synchronization signal of an image displayed on the display panel, and timing control information based on the horizontal synchronization signal is input to the touch panel control circuit, and wherein the sequence control circuit is configured to allow the switched capacitor circuit to continue the operation of sampling the signal from the X sensor electrodes in the display drive period and the touch detection period at a predetermined cycle based on the clock signal, output the pulses from the drive circuit in the touch detection period at the predetermined cycle based on the clock, and stop the output of the pulses from the drive circuit in the display drive period.

5. The touch panel control circuit according to claim 4, wherein the timing control information includes first information that specifies a period to initiation of the display drive period from the horizontal synchronization signal, second information that specifies a period to initiation of the touch detection period from the horizontal synchronization signal, and third information that specifies a cycle of the pulses and a high-period.

6. The touch panel control circuit according to claim 5, wherein the touch panel control circuit includes a storage device configured to store at least one of the first information, the second information, and the third information.

7. The touch panel control circuit according to claim 1, wherein the switched capacitor circuit includes an integration circuit connected to the X sensor electrodes in the predetermined period in synchronization with the pulses, and is also connected to the X sensor electrodes in a period in which the pulses are not input to accumulatively add signal charges that are input from the X sensor electrodes.

8. The touch panel control circuit according to claim 7, wherein the integration circuit is connected to the X sensor electrodes in periods in accordance with a rising edge and a falling edge of the pulses, respectively, and is connected to the X sensor electrodes in periods in accordance with a rising edge and a falling edge when assuming that the pulses continue at a cycle as is even in a period in which the pulses are not applied to the Y sensor electrodes to perform the accumulative addition by inverting a polarity when adding a signal charge that is input in the period corresponding to the rising edge and a polarity when adding a signal charge that is input in the period corresponding to the falling edge from each other.

9. The touch panel control circuit according to claim 1, wherein the switched capacitor circuit includes a switched capacitor filter which is connected to the X sensor electrodes in the predetermined period in synchronization with the pulses, and is connected to the X sensor electrodes in a period in which the pulses are not applied to the Y sensor electrodes to perform a filtering process with respect to a signal charge that is input from the X sensor electrodes, and an integration circuit configured to accumulatively add an output of the switched capacitor filter.

10. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:

a plurality of drive circuits connected to the plurality of Y sensor electrodes, respectively, and configured to apply a plurality of pulses to a corresponding Y sensor electrode for a predetermined period; and a plurality of detection circuits connected to the plurality of X sensor electrodes, respectively, wherein each of the detection circuits includes a switched capacitor circuit configured to perform sampling of a signal from each of the X sensor electrodes, to which the detection circuits are connected, at a timing that is in synchronization with the plurality of pulses, and at a timing at which the plurality of pulses are not applied to the Y sensor electrodes in the predetermined period, wherein the switched capacitor circuit includes a switched capacitor filter which is connected to the X sensor electrodes in the predetermined period in synchronization with the pulses, and is connected to the X sensor electrodes in a period in which the pulses are not applied to the Y sensor electrodes to perform a filtering process with respect to a signal charge that is input from the X sensor electrodes, and an integration circuit configured to accumulatively add an output of the switched capacitor filter, and wherein the switched capacitor filter is connected to the X sensor electrodes in periods in accordance with a rising edge and a falling edge of the pulses, respectively, and is connected to the X sensor electrodes in periods in accordance with a rising edge and a falling edge when assuming that the pulses continue at a cycle as is even in a period in which the pulses are not applied to the Y sensor electrodes to perform the filtering process by inverting a polarity when adding a signal charge that is input in the period corresponding to the rising edge and a polarity when adding a signal charge that is input in the period corresponding to the falling edge from each other.

11. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:

a plurality of drive circuits connected to the plurality of Y sensor electrodes, respectively, and configured to apply a plurality of pulses to a corresponding Y sensor electrode for a predetermined period; and a plurality of detection circuits connected to the plurality of X sensor electrodes, respectively, wherein each of the detection circuits includes a switched capacitor circuit configured to perform sampling of a signal from each of the X sensor electrodes, to which the detection circuits are connected, at a timing that is in synchronization with the plurality of pulses, and at a timing at which the plurality of pulses are not applied to the Y sensor electrodes in the predetermined period, wherein the switched capacitor circuit includes an integration circuit connected to the X sensor electrodes in the predetermined period in synchronization with the pulses, and is also connected to the X sensor electrodes in a period in which the pulses are not input to accumulatively add signal charges that are input from the X sensor electrodes, wherein the touch panel control circuit further comprises:
a sequence control circuit;
an analog/digital conversion circuit;
a plurality of sample-and-hold circuits configured to retain outputs of the plurality of detection circuits, respectively; and
a selection circuit configured to select one voltage from a plurality of voltages retained in the sample-and-hold circuits, and configured to supply the selected voltage to the analog/digital conversion circuit, wherein the sequence control circuit is configured to control the plurality of drive circuits in synchronization with a clock in order for the plurality of pulses to be sequentially applied to the plurality of Y sensor electrodes in a predetermined period in a manner that allows the plurality of detection circuits to operate in parallel in synchronization with the clock for every predetermined period, and is configured to control the selection circuit such that outputs of the plurality of detection circuits to be sequentially supplied to the analog/digital conversion circuit.

12. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:

a plurality of drive circuits connected to the plurality of Y sensor electrodes, respectively, and configured to apply a plurality of pulses to a corresponding Y sensor electrode for a predetermined period; and a plurality of detection circuits connected to the plurality of X sensor electrodes, respectively, wherein each of the detection circuits includes a switched capacitor circuit configured to perform sampling of a signal from each of the X sensor electrodes, to which the detection circuits are connected, at a timing that is in synchronization with the plurality of pulses, and at a timing at which the plurality of pulses are not applied to the Y sensor electrodes in the predetermined period, wherein the switched capacitor circuit includes a switched capacitor filter which is connected to the X sensor electrodes in the predetermined period in synchronization with the pulses, and is connected to the X sensor electrodes in a period in which the pulses are not applied to the Y sensor electrodes to perform a filtering process with respect to a signal charge that is input from the X sensor electrodes, and an integration circuit configured to accumulatively add an output of the switched capacitor filter, wherein the touch panel control circuit further comprises:
a sequence control circuit;
an analog/digital conversion circuit;
a plurality of sample-and-hold circuits configured to retain outputs of the plurality of detection circuits, respectively; and
a selection circuit configured to select one voltage from a plurality of voltages retained in the sample-and-hold circuits, and supply the selected voltage to the analog/digital conversion circuit, wherein the sequence control circuit is configured to control the plurality of drive circuits in synchronization with a clock signal such that the plurality of pulses are sequentially applied to the plurality of Y sensor electrodes in a predetermined period to allow the plurality of detection circuits to operate in parallel in synchronization with the clock for every predetermined period, and is configured to control the selection circuit such that outputs of the plurality of detection circuits are sequentially supplied to the analog/digital conversion circuit.

13. A semiconductor integrated circuit, comprising:
a touch panel control circuit disposed on a single semiconductor substrate and configured to be connected to a touch panel in which an intersection capacitor is formed at each of a plurality of intersections at which a plurality of Y sensor electrodes and a plurality of X sensor electrodes intersect each other, the touch panel control circuit comprising:

a plurality of drive circuits connected to the plurality of Y sensor electrodes, respectively, and each configured to apply a plurality of pulses to a corresponding one of the Y sensor electrodes; and a plurality of detection circuits connected to the plurality of X sensor electrodes, respectively, wherein each of the detection circuits includes a switched capacitor circuit configured to perform sampling of a signal from each of the X sensor electrodes, to which the detection circuits are connected, wherein the touch panel is mounted so as to overlap a display panel, and the touch panel control circuit is configured to perform timing control of providing a display drive period of the display panel and a touch detection period of the touch panel in each line period, wherein the plurality of drive circuits are configured to stop output of the pulses in the display drive period, and wherein each of the plurality of detection circuits is configured to allow the switched capacitor circuit to continue the operation of sampling the signal from each of the X sensor electrodes in the display drive period and the touch detection period.

14. The semiconductor integrated circuit according to claim 13, further comprising:

a display drive circuit disposed on the semiconductor substrate, wherein the display driver circuit is configured to be connected to a display panel configured to overlap the touch panel and configured to drive and control the display panel.

15. The semiconductor integrated circuit according to claim 14, further comprising:
a microcontroller disposed on the semiconductor substrate, wherein the microcontroller is configured to control the touch panel control circuit and is further configured to read out data based on the output of the plurality of detection circuits.

16. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:
a plurality of drive circuits connected to the plurality of Y sensor electrodes, respectively, and each configured to apply a plurality of pulses to a corresponding one of the Y sensor electrodes;
a plurality of detection circuits connected to the plurality of X sensor electrodes, respectively, through a plurality of input terminals; and
a sequence control circuit configured to control operation sequences of the plurality of drive circuits and the plurality of detection circuits,
wherein each of the detection circuits includes a switched capacitor circuit, an input terminal connected to a corresponding X sensor electrode, and an input switch configured to perform control of electrically connecting and cutting off the switched capacitor circuit, and
wherein the touch panel is mounted so as to overlap a display panel, and the touch panel control circuit is configured to perform timing control of providing a display drive period of the display panel and a touch detection period of the touch panel in each line period,
wherein the sequence control circuit is configured to perform control of electrically connecting and cutting off the input switch with respect to each of the detection circuits in the display drive period and the touch detection period in a continuous and repetitive manner at a predetermined cycle, and is further configured to allow each of the drive circuits to intermittently apply the plurality of pulses to the corresponding one of the Y sensor electrodes in the touch detection period in synchronization with the predetermined cycle and not to apply pulses to the corresponding one of the Y sensor electrodes in the display drive period.

17. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:
a plurality of drive circuits connected to the plurality of Y sensor electrodes, respectively, and configured to apply a plurality of pulses to a corresponding Y sensor electrode for every predetermined period;
a plurality of detection circuits connected to the plurality of X sensor electrodes, respectively, through a plurality of input terminals; and
a sequence control circuit configured to control operation sequences of the plurality of drive circuits and the plurality of detection circuits,
wherein each of the detection circuits includes a switched capacitor circuit, an input terminal connected to a corresponding X sensor electrode, and an input switch configured to perform control of electrically connecting and cutting off the switched capacitor circuit, and
the sequence control circuit is configured to perform control of electrically connecting and cutting off the input switch with respect to the detection circuit in the predetermined period in a continuous and repetitive manner at a predetermined cycle, and is further configured to allow the drive circuit to intermittently apply the plurality of pulses to a corresponding Y sensor electrode in the predetermined period in synchronization with the predetermined cycle,
wherein the switched capacitor circuit includes a first operational amplifier having a positive side input fixed to a predetermined potential, a first integration capacitor connected to between a negative side input and an output of the first operational amplifier, a first switch connected to between the negative side input and the output of the first operational amplifier, and the input switch,
wherein the input switch is connected to between the input terminal and the negative side input of the first operational amplifier, and
wherein the sequence control circuit is configured to allow the drive circuit to intermittently apply the plurality of pulses to a corresponding Y sensor electrode in the predetermined period at the same cycle as the predetermined cycle to electrically connect the first switch for every predetermined period and to discharge the first integration capacitor.

18. The touch panel control circuit according to claim 17, wherein the switched capacitor circuit is configured to perform control of inverting a connection direction of the first integration capacitor, and
wherein the sequence control circuit is configured to control a timing of turning on and off the input switch and the first switch of the detection circuit and a timing of inverting the connection direction of the first integration capacitor in synchronization with a rising edge and a falling edge of the plurality of pulses that are output to the drive circuit, and
wherein the sequence control circuit is further configured to, in a period in which the pulses are not applied to the Y sensor electrodes, turn on and off the input switch at timings in accordance with a rising edge and a falling edge when assuming that the pulses continue at a cycle as is so as to invert a connection direction of the first integration capacitor in a period corresponding to the rising edge and a connection direction of the first integration capacitor in a period corresponding to the falling edge from each other.

19. A touch panel control circuit configured to be connected to a touch panel in which an intersection capacitor is formed at each of a plurality of intersections at which a plurality of Y sensor electrodes and a plurality of X sensor electrodes intersect each other, the touch panel control circuit comprising:
a plurality of drive circuits connected to the plurality of Y sensor electrodes, respectively, and configured to apply a plurality of pulses to a corresponding Y sensor electrode for every predetermined period;
a plurality of detection circuits connected to the plurality of X sensor electrodes, respectively, through a plurality of input terminals; and a sequence control circuit configured to control operation sequences of the plurality of drive circuits and the plurality of detection circuits, wherein each of the detection circuits includes a switched capacitor circuit, an input terminal connected to a corresponding X sensor electrode, and an input switch configured to perform control of electrically connecting and cutting off the switched capacitor circuit, and the sequence control circuit is configured to perform control of electrically connecting and cutting off the input switch with respect to the detection circuit in the predetermined period in a continuous and repetitive manner at a predetermined cycle, and is further configured to allow the drive circuit to intermittently apply the plurality of pulses to a corresponding Y sensor electrode in the predetermined period in synchronization with the predetermined cycle, wherein, within the detection circuit, a first switched capacitor circuit connected to the input switch, a first sample-and-hold circuit, a second switched capacitor circuit, a second sample-and-hold circuit, an integration circuit, and a third sample-and-hold circuit configured to retain an output of the detection circuit are sequentially connected;

wherein the first switched capacitor circuit includes a first operational amplifier having a positive side input fixed to a predetermined potential, a first integration capacitor that is connected to between a negative side input and an output of the first operational amplifier, a first switch connected to between the negative side input and the output of the first operational amplifier, and a second switch connected to between the input terminal and the negative side input of the first operational amplifier, wherein the input switch is connected to between the input terminal and the negative side input of the first operational amplifier, wherein the second switched capacitor circuit includes a second operational amplifier having a positive side input fixed to a predetermined potential, a second integration capacitor connected to between a negative side input and an output of the second operational amplifier, and has a configuration in which a part or the entirety of a capacitance value is capable of being discharged by control, and a fourth switch connected to between an output of the first sample-and-hold circuit and the negative side input of the second operational amplifier, wherein the integration circuit includes a third operational amplifier having a positive side input fixed to a predetermined potential, a third integration capacitor connected to between a negative side input and an output of the third operational amplifier, a third switch connected to between the negative side input and the output of the third operational amplifier, and a fifth switch connected to between an output of the second sample-and-hold circuit and the negative side input of the third operational amplifier, and wherein the sequence control circuit is configured to continuously control a timing of turning on and off each of the input switch and the first to fifth switches of the detection circuit and a timing of discharging a part or the entirety of the second integration capacitor in synchronization with the plurality of pulses that are output to the drive circuit, and in synchronization with a timing when assuming that the pulses continue at a cycle as is in a period in which the pulses are not input.

20. The touch panel control circuit according to claim 19, wherein the switched capacitor circuit is configured to control inverting a connection direction of the first integration capacitor, wherein the sequence control circuit is configured to continuously control a timing of turning on and off the input switch and the first switch of the detection circuit and a timing of discharging a part or the entirety of the second integration capacitor in synchronization with a rising edge and a falling edge of the plurality of pulses that are output to the drive circuit, and in synchronization with timings in accordance with a rising edge and a falling edge when assuming that the pulses continue at a cycle as is in a period in which the pulses are not input, and wherein the sequence control circuit inverts a connection direction of the first integration capacitor at a timing corresponding to a rising edge of the plurality of pulses and a rising edge when assuming that the pulses continue at a cycle as is in a period in which the pulses are not input, and a connection direction of the first integration capacitor at a timing corresponding to a falling edge of the plurality of pulses and a falling edge when assuming that the pulses continue at a cycle as is in a period in which the pulses are not input from each other.

* * * * *